US008694400B1

(12) United States Patent  
Certain et al.

(10) Patent No.: US 8,694,400 B1  
(45) Date of Patent: Apr. 8, 2014

(54) MANAGING OPERATIONAL THROUGHPUT FOR SHARED RESOURCES

(75) Inventors: Tate Andrew Certain, Seattle, WA (US); Sachin Jain, Sammamish, WA (US); Bradley E. Marshall, Bainbridge Island, WA (US); Nicholas J. Maniscalco, Seattle, WA (US); Swaminathan Sivasubramanian, Seattle, WA (US); Matthew S. Garman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 335 days.

(21) Appl. No.: 12/882,082

(22) Filed: Sep. 14, 2010

(51) Int. Cl.  
*G06Q 40/00* (2012.01)

(52) U.S. Cl.  
USPC .......................................... 705/35; 705/26.3

(58) Field of Classification Search  
USPC ................... 705/35–45; 370/229; 709/223  
See application file for complete search history.

(56) References Cited

U.S. PATENT DOCUMENTS

| | | | |
|---|---|---|---|
| 6,604,155 B1 | 8/2003 | Chong, Jr. | |
| 6,928,470 B1 | 8/2005 | Hamlin | |
| 7,054,943 B1 | 5/2006 | Goldszmidt et al. | |
| 7,139,821 B1 | 11/2006 | Shah et al. | |
| 7,523,063 B2 * | 4/2009 | Harrington et al. | 705/37 |
| 7,555,456 B2 * | 6/2009 | Rosenthal et al. | 705/37 |
| 8,271,336 B2 | 9/2012 | Mikurak | |
| 8,280,790 B2 * | 10/2012 | Lappas et al. | 705/34 |
| 2002/0083116 A1 | 6/2002 | Petrini et al. | |
| 2003/0018642 A1 | 1/2003 | Bakalash et al. | |
| 2003/0028642 A1 | 2/2003 | Agarwal et al. | |
| 2004/0107281 A1 | 6/2004 | Bose et al. | |
| 2004/0133622 A1 | 7/2004 | Clubb et al. | |
| 2008/0109343 A1 | 5/2008 | Robinson et al. | |
| 2009/0049443 A1 | 2/2009 | Powers et al. | |
| 2009/0172191 A1 | 7/2009 | Dumitriu et al. | |
| 2010/0076856 A1 * | 3/2010 | Mullins | 705/26 |
| 2011/0173637 A1 | 7/2011 | Brandwine et al. | |
| 2011/0238546 A1 | 9/2011 | Certain et al. | |

OTHER PUBLICATIONS

Ben_Yehuda et al., Deconstucting Amazon EC2 Spot Instance Pricing, Computer Science Department Israel Institute of Technology, 2010. http://www.mulix.org/pubs/cloud/spotprice-cloudcom.pdf.*

(Continued)

*Primary Examiner* — Richard C Weisberger  
(74) *Attorney, Agent, or Firm* — Novak Druce Connolly Bove + Quigg LLP

(57) ABSTRACT

Usage of shared resources can be managed by enabling users to obtain different types of guarantees at different times for various types and/or levels of resource capacity. A user can select to have an amount or rate of capacity dedicated to that user. A user can also select reserved capacity for at least a portion of the requests, tasks, or program execution for that user, where the user has priority to that capacity but other users can utilize the excess capacity during other periods. Users can alternatively specify to use the excess capacity or other variable, non-guaranteed capacity. The capacity can be for any appropriate functional aspect of a resource, such as computational capacity, throughput, latency, bandwidth, and storage. Users can submit bids for various types and combinations of excess capacity, and winning bids can receive dedicated use of the excess capacity for at least a period of time.

34 Claims, 10 Drawing Sheets

(56) References Cited

OTHER PUBLICATIONS

M. Frank. (Apr. 2002) The OCEAN Project: The Open Computation Exchange & Auctioning Network. Available: http://www.cise.ufl.edu/research/ocean/.*

Jelling, Jacob. "Your PC Can Contribute with Google Compute." Web Pro News, Sep. 29, 2004 [retrieved on Jan. 18, 2013]. Retrieved from the Internet: <URL: http://www.webpronews.com/your-pc-can-contribute-with-google-compute-2004-09>.

McDonald, Paul. "Announcing Open Signups, Expected Pricing and Two New APIs." Google, May 28, 2008. [retrieved on Jan. 18, 2013]. Retrieved from the Internet: <URL: http://googleappengine.blogspot.com/2008/05/announcing-open-signups-expected.html>.

Sun to Be Part of First Online Compute Exchange. [online]. HCP in the Cloud, Feb. 14, 2005 [retrieved on Jan. 18, 2013]. Retrieved from the Internet: <URL: http://www.hpcinthecloud.com/hpccloud/2005-02-14/sun_to_be_part_of_first_online_compute_exchange.html>.

What is Google App Engine?. Datasheet [online]. Google, 2013 [retrieved on Jan. 18, 2013]. Retrieved from the Internet: <URL: https://developers.google.com/appengine/docs/whatisgoogleappengine>.

International Search Report and Written Opinion for Patent Cooperation Treaty Application No. PCT/US2011/030389, mailed May 25, 2011.

U.S. Appl. No. 12/882,075, "Non-Final Office Action", Feb. 15, 2013, 13 pages.

* cited by examiner

700

|  | compute capacity A | compute capacity B | IOPS rate A | IOPS rate B | bandwidth rate A | bandwidth rate B | maximum latency A | maximum latency B |
|---|---|---|---|---|---|---|---|---|
| compute capacity A | - | - | $0.04 | $0.06 | 0 | $0.04 | $0.04 | $0.04 |
| compute capacity B | - | - | $0.06 | $0.08 | 0 | $0.06 | $0.06 | $0.06 |
| IOPS rate A | $0.04 | $0.06 | - | - | 0 | $0.04 | $0.04 | $0.06 |
| IOPS rate B | $0.06 | $0.08 | - | - | 0 | $0.06 | $0.06 | $0.06 |
| bandwidth rate A | 0 | 0 | 0 | 0 | - | - | 0 | 0 |
| bandwidth rate B | $0.04 | $0.06 | $0.04 | $0.06 | - | - | $0.04 | $0.04 |
| maximum latency A | $0.04 | $0.06 | $0.04 | $0.06 | 0 | $0.04 | - | - |
| maximum latency B | $0.04 | $0.06 | $0.06 | $0.06 | 0 | $0.04 | - | - |

Standard bid – default compute capacity $0.04

| | |
|---|---|
| compute capacity B | +$0.02 |
| IOPS rate A | 0 |
| IOPS rate B | 0 |
| bandwidth rate A | No bid |
| bandwidth rate B | 0 |
| maximum latency A | -$0.01 |
| maximum latency B | 0 |

FIG. 7(b)

MANAGING OPERATIONAL THROUGHPUT FOR SHARED RESOURCES

BACKGROUND

As an increasing number of applications and services are being made available over networks such as the Internet, an increasing number of content, application, and/or service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as remote servers and data repositories, wherein the users can concurrently send multiple requests to be executed against the same resource. Problems can arise, however, since there is a limited amount of capacity for each type of resource. Conventional systems address these problems by providing dedicated resources to users and/or purchasing additional capacity, but such approaches are expensive and often result in unused excess capacity. Further, each resource can have more than one type of capacity, such as a compute capacity, a throughput limit, an available bandwidth, and other such aspects. Since conventional systems do not optimize the usage of various types of resource capacity for shared resources, there often is excess capacity in one or more of these capacity types even if one or more other types of capacity are being substantially fully utilized.

BRIEF DESCRIPTION OF THE DRAWINGS

Various embodiments in accordance with the present disclosure will be described with reference to the drawings, in which:

FIGS. 7(a) and 7(b) illustrate example bid sets that can be provided in accordance with various embodiments;

DETAILED DESCRIPTION

Figure 1:
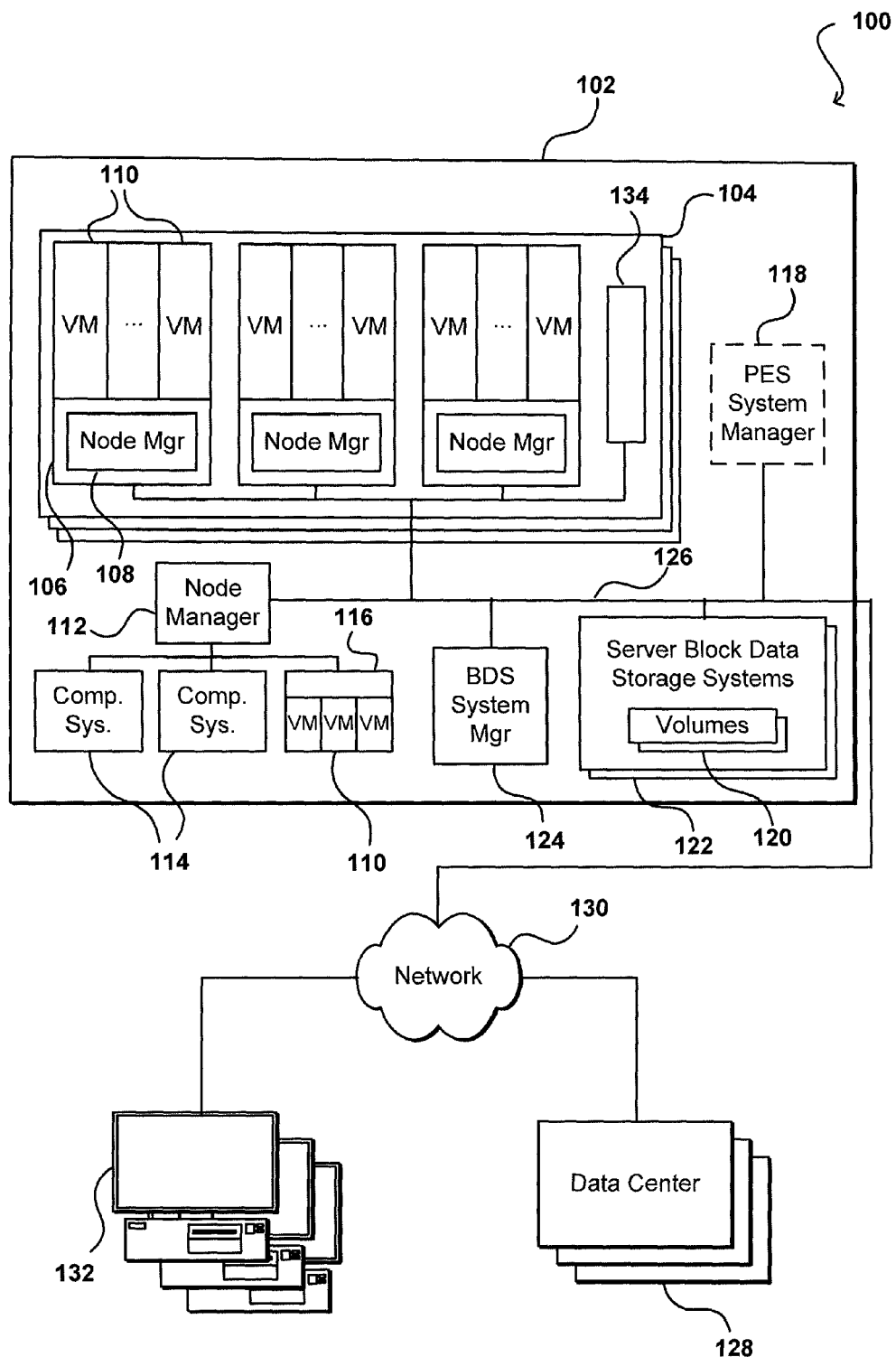
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of resource sharing and allocation in an electronic environment. For example, various embodiments enable users to request a specific quality of service or level of processing for each of a plurality of different resource aspects, such as a guaranteed and/or committed amount of: throughput, bandwidth, latency, processing capacity, and/or storage capacity for a given resource. The requested amount(s) can be any appropriate amount, which can be less or greater than the total amount provided by any single instance or device of the respective resource, providing improved granularity over that which is possible with conventional approaches. Multiple customers can be assigned to a single resource, such as a data server or data store, with each of the customers potentially receiving at least one guaranteed level of service over at least a specified period of time. By managing the allocations for customers on various resources at different times according to different functional aspects, customers can obtain resource usage that provides desired levels of performance for one or more aspects of a resource, during the times when those levels are needed, but minimizes the cost to the user that would otherwise be associated with dedicated capacity and/or hardware for those users.

Certain terms are used herein for purposes of clarity of explanation, but it should be understood that such terms in the various examples are not intended to be interpreted as limitations on those examples or the various embodiments. For example, it should be understood that terms such as "user" and "customer" are used substantially interchangeably herein, as a user of a management system or service as discussed herein may or may not be a paying customer or subscriber of the service, etc. Further, there can be multiple types of requests at various stages, locations, or other portions of the various embodiments, such as requests from a user to a control plane to obtain or purchase an amount of reserved or dedicated capacity (or a right to create future instances or volumes), requests from a user to a control plane to launch an instance, create a volume, or otherwise invoke that reserved capacity, and requests from applications in the data plane to perform specific operations against a particular instance, volume, or capacity, among others. For purposes of clarity, requests to obtain the rights to create future instances or volumes, or perform similar actions, will be referred to herein as "reservation requests." Requests to launch an instance or create a volume per those rights, or perform similar actions, will be referred to as "instance requests." Requests from applications or other sources to be executed or processed against user instances, volumes, etc., will be referred to herein as "data requests" or "I/O operations." It should be understood, however, that these terms are used only for convenience of explanation and are not intended to imply that those types of requests are limited in nature to the type of operation indicated by the specific name of the request, as an "instance request" might not require that a new instance be launched, but can relate in some other way to providing specific capacity or resources for a user, or for a similar such purpose.

Customers in various embodiments can be provided with different types of resource capacity guarantees. For example, a customer might want requests to be processed with an average or maximum amount of latency and with a specific amount of throughput. Various embodiments can place users on common resources based on various combinations of these and other such factors. For example, a user who needs a lot of storage that will rarely be accessed can be placed on a resource with a user who needs very little storage but will require a lot of throughput to frequently access that data. Further, users with high specific capacity requests can be given priority over other users when resources with that higher capacity become available. Various other ways of selecting user requests to process on various resources are discussed with respect to the various embodiments.

Further, a customer can be enabled to request different qualities of service, or different types of guarantees, at different times. For example, a customer might request a higher level of throughput at certain times of the day, but when the resource will not be used at the same level the customer might want a lower level of service. Various embodiments enable a customer to schedule different qualities of service throughout the day, or request a first quality of service up to a certain amount and a second quality of service for any requests in excess of that amount. In some embodiments, customers can request a dedicated amount of capacity for one or more resource types that will always be available to that customer. In some embodiments, a customer can also request dedicated reserved capacity that can come at a lower cost, and can enable the customer to use that capacity when needed, as well as to enable other users to utilize that capacity when not being used by the customer having the reserved capacity.

Customers then can also utilize the unused or excess capacity from dedicated, reserved, or other such resource capacity. In many embodiments, customers can "bid" to use the excess capacity. For example, a customer can submit an instance request with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the customer with the winning bid will obtain dedicated use of that excess capacity for at least a period of time to process I/O operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

In some cases a customer might exceed the customer's dedicated or reserved capacity. In such cases, the customer might elect to submit bids in an attempt to process the excess requests with excess resource capacity. If excess capacity is not available, or if the customer does not wish to exceed a certain cost point, the customer can elect to submit an instance request as a standard request which can be processed with variable and/or on-demand capacity that may not come with any guarantees. Such a request will only be processed if variable capacity is available, and may be limited to the types of capacity available.

The time at which certain guarantees are provided also can vary between embodiments. For example, a customer might request a certain quality of service, such as a certain amount of bandwidth, at a certain time of day, with a different guarantee (or no guarantee) at other times of day. In other embodiments, guarantees or dedicated capacity might be provided using one or more sliding time windows, wherein a customer is guaranteed to get a certain amount of time (e.g., twenty minutes or an hour) every day with at least one resource guarantee, but the system might determine when during the course of the day to provide that functionality. A customer might be charged less for a sliding window approach than a fixed time approach, as the system can provide the resource when there is a lower load on the system or there is otherwise more excess capacity to use to provide the guarantee, which can reduce the total resource capacity that the system or service must provide.

In some embodiments, a private pool of excess resource capacity of one or more resource capacity types can be maintained for, and associated with, a customer user, such as may be based on currently unused resource capacity that has been allocated for dedicated use by that customer, with the private pool of excess resource capacity being available for priority use by the customer. Such private excess resource capacity pools may further be provided to a general, non-private excess capacity pool that is available for use by various users, which can also include users who are associated with the private excess capacity pool(s). The usage of the resources can, in some embodiments, be managed using a program execution service ("PES") that executes multiple programs or otherwise processes requests or tasks on behalf of multiple customers or subscribers. The PES can provide a plurality of resource nodes (e.g., multiple physical computing systems and/or virtual machines that are hosted on one or more physical computing systems) and other such resources for executing user programs and fulfilling user requests.

In some embodiments, at least some excess or otherwise unused resource capacity of a PES or other group of resources may be made available to users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the PES in order to make that excess capacity available for the other purposes. In at least some embodiments, the user requests or operations can be automatically restarted o at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

In some embodiments, at least some of the available resource capacity can be allocated to one or more users for preferential use by those users, such that each of those users has priority access relative to other users to use a respective amount of the resource capacity. For example, the priority access of the users may be based on each of the users having dedicated or exclusive access to use the respective amount of resource capacity (e.g., each user having one or more dedicated resources and/or portions thereof that are allocated for reserved or guaranteed use by the user). In at least some such embodiments, a respective amount of resource capacity may be allocated to a particular user for dedicated access over a specified period of time, such as in a manner analogous to a lease of one or more physical computing systems so that the respective amount of resource capacity may be available to the user throughout the specified period of time. In addition, a user may be given preferential or other dedicated access to resource capacity based on one or more factors, such as fees paid by the user, an agreement to a contractual obligation for using the dedicated access for a period of time and/or subject to other conditions, etc.

If a user has a private pool of excess resource capacity and there is a separate general pool of excess resource capacity that is also available, the different excess resource capacity pools may be used in various manners. For example, if such a user makes an instance request to use excess resource capacity, the instance request may first be satisfied using that user's private pool if the pool has sufficient computing capacity for the request, and otherwise the request may be considered for satisfaction by the general excess capacity pool along with instance requests from other users. Similarly, if one or more first programs for such a user are using the user's private pool of excess capacity, and that excess capacity is desired by the user for other purposes (e.g., to store information for other second programs for the user as part of the user's dedicated computing capacity), the use by the one or more first programs may in some embodiments automatically be moved to the general excess capacity pool.

In addition to the types of dedicated, reserved, and excess resource capacity capabilities discussed above, a customer in various embodiments may also be able to utilize on-demand variable resource capacity that is available to satisfy at least some dynamically received requests from users, whether the requests are to be instance requests to be processed immediately upon receipt, reservation requests for an indicated future time or at some time during an indicated future time period, etc. Such a request can be processed if resources sufficient to satisfy the request are available at (or near) the requested time, but without such a request being guaranteed to be satisfied (i.e., without sufficient resources being guaranteed to be available). For example, after an on-demand variable resource capacity instance request is received for immediate execution, the instance request may be processed for the user if an appropriate amount of on-demand resource capacity is currently available, and otherwise the instance request may be denied (or in some cases, postponed). Thus, in some such embodiments, such a request for on-demand variable capacity may be unsuccessful, such as if the appropriate amount of capacity is not available at the time of the requested execution.

Furthermore, in embodiments in which a PES provides multiple types and/or levels dedicated resource capacity, excess resource capacity, and on-demand variable resource capacity to users for fees, the fees associated with the different types of capacity may differ in various manners, such as to reflect associated availability guarantees and/or other factors. As one example, the overall cost for a user receive a guaranteed rate of 1,000 IOPS may be higher than the cost to the user to receive a rate of 1,000 IOPS using on-demand variable capacity (if available), and that cost to the user to use the on-demand variable capacity may be higher than the cost to the user to make use of a comparable amount of excess capacity (if available) from a general pool. In some cases, however, the cost of using dedicated capacity may include a one-time or periodic fee that is not based on actual use, and a separate ongoing incremental cost for a user to make use of a particular amount of dedicated capacity for a particular amount of time, with that ongoing incremental cost for a particular amount of dedicated capacity use optionally being less than the cost for using a comparable amount of general excess capacity pool for that period of time. Furthermore, as noted above, costs for using a private excess capacity pool may differ from those of using a general excess capacity pool, such as to be the same as the ongoing incremental cost for dedicated capacity use. Various other possibilities are contemplated within the scope of the various embodiments described and suggested below.

Systems and methods in accordance with various embodiments are operable to manage access to resources such as data storage and data servers. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more resource nodes that are instructed to access and use the first volume (e.g., in a serial manner, in a simultaneous or other overlapping manner, etc.). When an application executing on a resource node initiates use of a non-local volume, the application may mount or otherwise be provided with a logical block data storage device that is local to the resource node and that represents the non-local volume, such as to allow the executing program to interact with the local logical block data storage device in the same manner as any other local hard drive or other physical block data storage device that is attached to the resource node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or resource node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a PES system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine resource nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the program execution service.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node Manager module 108 associated with the virtual machines on that host computing system to manage those virtual machines. One or more other host computing systems 116 may also each host one or more virtual machines 110 in this example. Each virtual machine 110 may act as an independent resource node for executing one or more program copies (not shown) for a user (not shown), such as a customer of the program execution service, or performing another such action or process or user data requests, I/O operations, etc. In addition, this example data center 102 further includes additional host computing systems 114 that do not include distinct virtual machines, but may nonetheless each act as a resource node for one or more programs (not shown) being executed for a user. In this example, a Node Manager module 112 executing on a computing system (not shown) distinct from the host computing systems 114 and 116 is associated with those host computing systems to manage the resource nodes provided by those host computing systems, such as in a manner similar to the Node Manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the resource nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 108 and 112 to manage program execution on resource nodes associated with the Node Manager modules, while in other embodiments the Node Manager modules may not assist in managing such execution of programs.

This example the data center 102 also includes a computing system 124 that executes a Block Data Storage ("BDS") system manager module for the block data storage service to assist in managing the availability of non-local block data storage to programs executing on resource nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various resource nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules to manage use of volumes by programs executing on associated resource nodes, while in other embodiments the Node Manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the resource nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
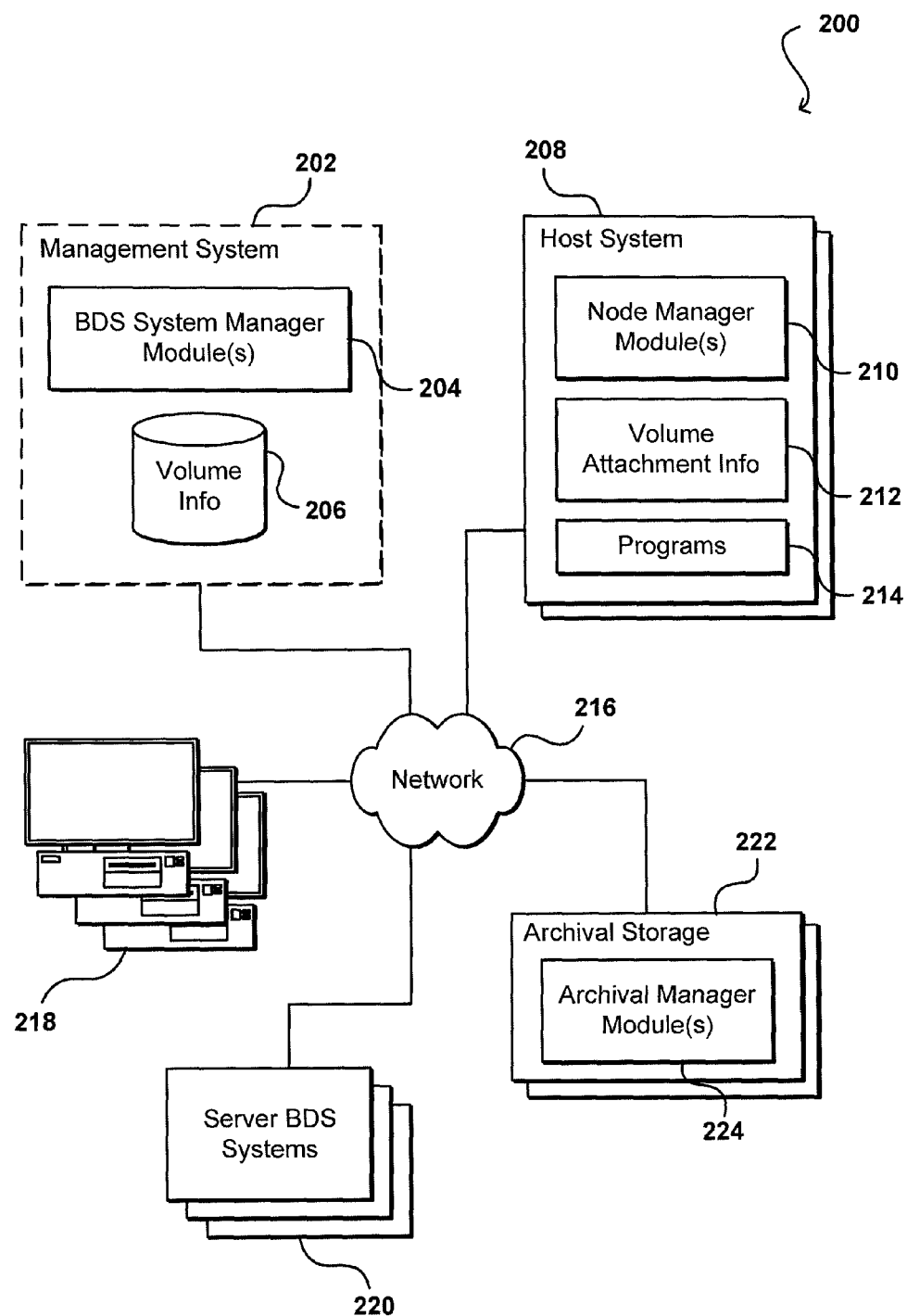
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS System Manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a Node Manager module 210 to manage access of programs 214 executing on the host computing system to at least some of the non-local block data storage volumes, such as in a coordinated manner with the BDS System Manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the Node Manager modules 108 and 112 of FIG. 1 may correspond to the Node Manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a Node Manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine resource node. The Node Manager module 210 may similarly be executing on another hosted virtual machine, such as a privileged virtual machine monitor that manages the other hosted virtual machines. In other embodiments, the executing program copies 214 and the Node Manager module 210 may execute as distinct processes on a single operating system (not shown) executed on a single computing system 208.

The archival storage system 222 is operable to execute at least one Archival Manager module 224 in order to manage operation of one or more of the archival storage systems, such as on behalf of customers of the block data storage service and/or of a distinct storage service that provides the archival storage systems. In other embodiments, the Archival Manager module(s) 224 may instead be executing on another computing system, such as one of the other computing systems 218 or on the management system 202 in conjunction with the BDS System Manager module 204. In addition, while not illustrated here, in some embodiments various information about the data that is stored by the archival storage systems 222 may be maintained in storage for the archival storage systems or elsewhere.

The BDS System Manager module 204 and Node Manager modules 210 may take various actions to manage the provisioning and/or use of reliable non-local block data storage functionality to clients (e.g., executing programs), as described in greater detail elsewhere. In this example, the BDS System Manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by Node Manager modules 210 on their computing systems and/or by other computing systems. In addition, in this example, each Node Manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

A PES or similar system or service enable customers to ensure a minimum level of performance by enabling each customer to specify one or more committed rates or other performance guarantees. In addition to a minimum amount of storage, each customer can purchase a committed rate of operations, such as a specific rate of input/output (I/O) operations. In previous systems, performance guarantees were obtained by dedicating an entire machine to a customer, along with dedicated bandwidth, etc., which often is overkill. Embodiments discussed herein can allow customers to purchase performance guarantees at any appropriate level of granularity. By managing the performance allocations for customers on various resources, systems and methods in accordance with various embodiments can enable customers to purchase volumes that have an IOPS guarantee at any appropriate level, for example, such as between 1 IOPS and 5,000 IOPS. By allocating portions of disks, spindles, and other such resources, a system can offer customers guaranteed levels of storage and/or I/O operations rates.

Such a system or service can also enable users to share resources, providing specific guarantees or commitments with respect to those resources at a level of granularity that is not possible with conventional solutions. In many cases, customers may wish to specify a minimum processing rate, such as a minimum rate of I/O operations. Approaches in accordance with various embodiments can commit the desired amount of server, storage, and/or other resources necessary to provide at least a committed level of performance. By committing to a level of performance, a customer can receive a consistent quality of service level that is not affected by the performance of other customers sharing a device or resource. Even in an overload situation, the customer can receive at least the guaranteed level of service. The amount of guaranteed service can depend upon various factors, as well as the amount specified and paid for by the customer.

Figure 3:
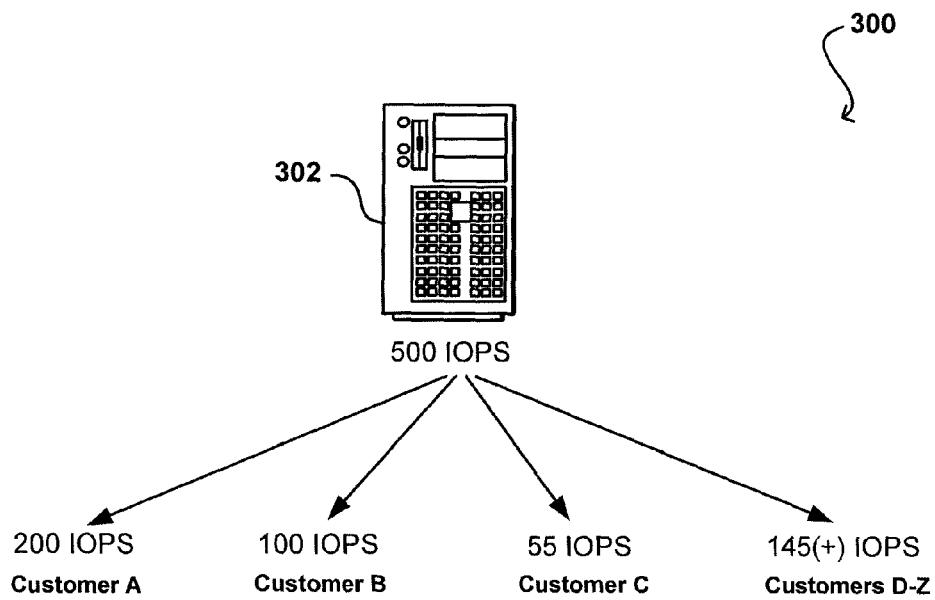
FIG. 3 illustrates an example allocation for multiple customers that can be used in accordance with various embodiments.

For example, FIG. 3 illustrates an example distribution 300 wherein the processing capacity of a server 302 is allocated among several customers. In this example, the server is determined to have a capacity for about 500 IOPS. This value can be an estimated or average value, and can be determined or adjusted over time based on monitored performance or other such information. While all 500 IOPS can be allocated in some embodiments, it can be desirable in other embodiments to only allocate a threshold amount, percentage, or other portion of the total capacity as guarantees. Since the processing time for each request can vary, the number of IOPS at any given time can vary as well, such that allocating all 500 IOPS might cause short periods of time where the customers are unable to receive their guarantees when the actual performance is on the order of 450 IOPS due to the nature of the requests being processed, etc.

In this example, the system might be able to allocate up to 400 of the 500 IOPS available for the server 302. As can be seen, Customer A has been allocated a committed 200 IOPS, Customer B has been allocated a committed 100 IOPS, and Customer C has been allocated a committed 55 IOPS. The remaining customers on the server then can utilize a "best performance" or similar approach sharing the remaining 145 IOPS (on average). The number of customers sharing the remaining IOPS can be selected or limited based upon a number of factors, such that the remaining customers can still obtain a desirable level of performance a large percentage of the time.

In many cases, however, Customers A, B, and C will not all utilize their entire committed capacity. Each of those customers might pay to guarantee a level of performance such that the level is available when needed, but often will not actually be running near that peak capacity. In this situation, the remaining Customers D-Z can actually share more than the remaining 145 IOPS, or "remnants," as those customers can utilize available capacity from the committed IOPS that are not being currently used. This provides another advantage, as customers can receive guaranteed levels of performance, but when those levels are not being fully utilized the remaining capacity can be used to service other customer requests. Such an approach enables the regular customers (without guarantees) to receive improved performance, without the need for the provider to purchase excess capacity or provide capacity that is not being utilized a vast majority of the time.

In some embodiments, any of Customers A-C can exceed their performance guarantees. For example, Customer A might, for a period of time, submit requests on the order of 250 IOPS. For the 50 IOPS above the committed rate, those requests in some embodiments can be treated as normal requests and processed at the same performance level as those of customers D-Z. In an overload situation, any throttling, slow down, or other reduction in processing can then be applied to the 145 or so IOPS that are not subject to guarantees. The guaranteed levels for Customers A, B, and C will not be affected, as the overflow adjustments are made to the non-committed portion. Accordingly, customers with non-guaranteed levels of service can be charged lower prices per request, period, etc.

In other embodiments, when any of Customers A-C exceed its performance guarantees, that customer can receive a "blended" or other level of service. In a situation where each request for a customer is treated individually or without context, such that any single request over a committed rate can be treated as a request without a committed rate, there can be a negative impact on the other requests for that customer. For example, if Customer A has a committed rate of 250 IOPS and at one point issues 251 requests in a second, that single request over the rate commitment can be processed much more slowly than the other requests, such as at 20 ms instead of 1 ms. If the customer application is expecting a performance level of about 1 ms and experiences a slowdown with respect to one request, that can have an impact on the fulfilling of the other requests as well, and can cause a significant slowdown or other problems for the application even though the customer only slightly exceeded the threshold for a short period of time.

A PES Manager can address such a situation by providing a "boost" or blended rate to customers with rate guarantees who exceed those guarantees, which provides a level of service between a committed and uncommitted rate. For example, a customer with a rate guarantee might have any excess requests placed at or near the front of the "queue" for uncommitted requests. In other embodiments, the customer might receive a lower rate commitment for those requests, such as might experience a delay of about 5 ms, which are not processed at the same rate as requests within the committed rate, but are processed more quickly than for customers without a committed rate. The amount of delay can be related in some embodiments to the amount of overage and the length of time that the customer is over the guaranteed rate, to provide a relatively uniform degradation in performance that is at least somewhat proportional to the amount of overage. For example, a customer with a guaranteed rate of 100 IOPS who is consistently sending requests at a rate of 500 per second would likely not receive as much of a boost as a customer with a 250 IOPS guaranteed rate who occasionally goes over by a handful of requests. In some embodiments, a customer can be provided with the same rate for any overage, but can be charged a premium for each such request. Many other variations are possible as well within the scope of the various embodiments.

To manage the commitments, components of a control plane can essentially make reservations against specific servers or other resources in the data plane. In FIG. 3 where three customers want a total of 355 IOPS committed, the control plane can reserve that level against a single server, for example, and allocate the remainder to any other customer provisioned on that server. The control plane can also ensure that more volumes are not allocated to a server than the server can handle, due to space limitations, the number of I/Os that need to be generated, or any other such factor.

Figure 4:
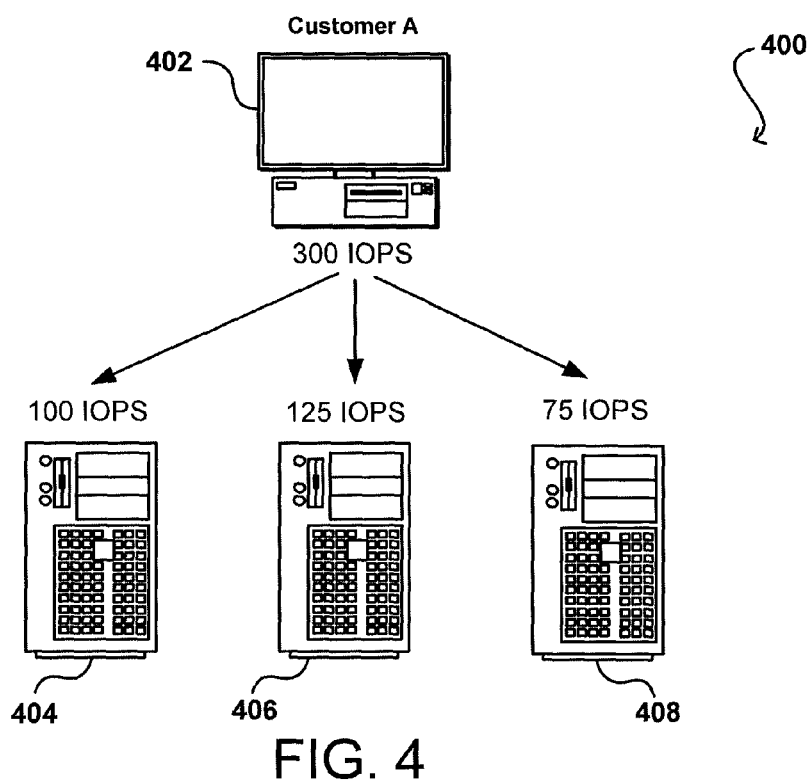
FIG. 4 illustrates an example allocation across multiple resource instances that can be used in accordance with various embodiments.

In some cases, a customer might want a guaranteed level of service that exceeds the "committable" capacity for a given resource. For example, in FIG. 3 it was stated that the server could allocate 400 IOPS, but 355 are already allocated to Customers A-C. If another customer wants 300 IOPS, that number would exceed the allowed amount (as well as the average capacity) of the server. Thus, the customer cannot receive the desired commitment on that server. Using the management components of the control plane, however, the commitment rate can be allocated across multiple servers. For example, in the allocation 400 of FIG. 4, it is shown that Customer A sends a request from a user device 402 requesting a guarantee of 300 IOPS. The control plane in some embodiments can search the available servers to determine if a server is available with 300 IOPS left for guarantees. If not, the control plane can attempt to spread the IOPS across as few servers as possible. In this case, the control plane determines to allocate the IOPS guarantee across three servers, with a first server 404 providing a guarantee of 100 IOPS, a second server 406 providing a guarantee of 125 IOPS, and a third server 408 providing a guarantee of 75 IOPS. Thus, a volume does not need to be resident on a single server as in many conventional systems, but can be partitioned across multiple servers. The allocation across multiple servers also enables customers to utilize larger data volumes, such as volumes of 50 terabytes instead of 1 terabyte, as the data can be spread across multiple servers. In such an embodiment, a customer can purchase between 1 GB and 50 TB of storage, for example, with a desired commitment rate, such as a rate between 0 IOPS and 5,000 IOPS. Based on one or more of these values selected by a customer, the control plane can determine an appropriate, if not optimal, way to provide those guarantees using available resources in the data plane.

In some embodiments, the committed rate might be allocated up to 100% of the capacity of a server. An amount of un-committed usage can be predicted and/or monitored, such that a number of customers can be allocated to resources that are fully committed, as long as the customer is willing to take resources only as they come available. Certain customers might not care when IOPS occur, particularly for certain writes, such that they would be willing to pay a lower rate to utilize resources that are guaranteed up to 100%, knowing that some customers likely will not utilize their full guaranteed levels. Such an approach assists the provider in maximizing the utilization of each resource by allocating un-committed IOPS on resources that are otherwise "fully" committed.

Further, different types of customers will have different requirements. For example, if a disk has 100 TB of space and 100 IOPS capacity, a first customer might want to store 90 TB of vacation photos that are rarely accessed. That customer might be interested in purchasing 90 TB of storage space along with an uncommitted rate of I/O operations. Another user might want a 1 TB database that is going to be under constant use, such that the user might want about 100 IOPS. In this example, the first customer could be sold 90% of the for storage, and the other customer can be allocated 90% (or more) of the I/O operation capacity of the disk as a commitment. Due to the nature of the customers, they both could be provisioned on the same disk, where otherwise each might have required a dedicated disk.

Enabling others to utilize the unused portion of a customer's committed allocation can benefit that customer as well, because the customer may not have to pay for the entire allocation and thus can receive a lower cost that would be required for a dedicated resource. Further, the customer will still receive the guaranteed level of service. When the customer is at the full committed level, other customers on that device will have to reduce their rate of request or wait longer per request. In some embodiments, a resource can be fully committed and other users can still be provisioned on the device to utilize the unused portions of the resource. In some cases, where predictions and monitoring accurately support such use, a resource can even be committed for over 100%, where the actual use by the allocated customers will almost never equal or surpass 100% usage. In such an embodiment, there can be other resources that can pick up any overage in the event of an unlikely event where the resource is overloaded.

In order to make commitments on a new resource (or new instance of a resource), certain default information can be used to make commitments. It can be desirable to use relatively conservative numbers as the defaults, in order to prevent over-committing a resource. For example, a control plane component can use general default information that each spindle of a particular type can handle 100-120 IOPS. If there are twelve spindles per server, there can be about 1200-1440 IOPS available per server. The control plane components can be conservative, initially, and can allocate a first amount, such as up to 400 IOPS, until more information is gained about the performance and usage of that resource. In certain examples customer utilization is about 10%, such that in many instances customers are using only 10% of the available IOPS. Thus, dedicating 40% to guaranteed IOPS would still be four times more than is actually being used, and thus likely is still a conservative number. Each server in the data plane can track the amount of available space on the server, and can store the number of IOPS that are committed for that server. Thus, when a new volume is to be created, the control plane components can determine a server that, out of that 400 IOPS, has enough capacity available that the server is willing to commit for that volume. An approach in one embodiment is to ask servers, at random or in a particular order, whether they can take a specific number of IOPS, and this continues until a server is located that can accept the IOPS. When the information is also stored in the control plane, however, the control plane can select an appropriate server first and then contact that server to take the volume.

In many situations, however, a user will not utilize the throughput (or other functional aspects) provided by a guarantee such as those described above. As illustrated in FIG. 3, the user might have a guaranteed available rate of I/O operations provided by three different servers, but during normal use might only use a rate of operations that could be provided by one of those servers, or a portion of each server. In such an example, the user might prefer not to have to pay for the guarantees, or dedicated rate of I/O operations, at all times. The user might be willing to instead pay for a certain amount of dedicated capacity, such as a dedicated rate of 125 IOPS that are always dedicated to the user. For the other 175 IOPS that the user only uses occasionally, however, the user might be willing to reserve capacity that can enable other users to utilize that capacity while the capacity is not being used, in order to help spread the cost of the capacity to those other users. In other cases, the user might want to only pay for those requests that exceed the dedicated (or reserved) capacity. Thus, the user might prefer to get priority for those requests over requests from average users, but might not want to be charged for more capacity than is actually being used. The user in many embodiments can achieve this by submitting a bid price along with the request, which will cause that request to receive priority treatment if that bid exceeds the current market price and/or exceeds any other pending bid for the same type of capacity. Such a process can be complex for a large number of users with different types of requests and requirements.

Systems and methods in accordance with various embodiments, such as the systems described with respect to FIGS. 1 and 2, can be used to manage these and other functional aspects of one or more types of shared resource, in order to provide flexibility and management of the way in which those shared resources are utilized. Shared resources can provide storage and/or processing capacity, with various levels of throughput, bandwidth, latency, and other such aspects. In one example, a number of customers interact with at least one PES Manager module (or other such module, process, or component) to process various types of requests, execute programs, or otherwise access resources on one or more resource nodes, with the PES Manager module providing some or all of the functionality of a particular program execution service. The customers can include different types of customers, including customers with dedicated rates or guarantees of at least one functional aspect or resource capacity, such as may include storage capacity, computing capacity, storage and/or network bandwidth, throughput, and/or latency. There also can be customers who utilize excess resource capacity, customers who utilize on-demand variable capacity, and other types of customers and/or other users.

The resource nodes can be provided for use in executing instructions or fulfilling requests on behalf of the users, and in some embodiments may include multiple physical computing systems, virtual machines, storage instances, or other such resources that are hosted on one or more physical systems. Each of the resource nodes has some amount of resources available that provide a specific amount of resource capacity, such as may be measured, for example, by a combination of one or more of processing capacity (e.g., number and/or size of processing units), memory capacity, storage capacity, bandwidth capacity, latency capacity, etc. In some embodiments, the PES provider may provide preconfigured resource nodes, with each pre-configured resource node having similar and/or equivalent amounts of resources available to users, while in other embodiments the PES provider may provide a selection of various different resource nodes from which a user may choose, or that might otherwise be assigned to one or more users. In some embodiments, the resources can be offered as individual components which the user can utilize independently of any other resource. In other embodiments, resources can be offered in packages, groups, or other such combinations. In one example, a user might make a request for a system that includes many resource types, each of which may have associated capacity requirements. If at least one of those requirements cannot be met, some embodiments will reject the whole system request while other embodiments can allow the user to obtain those types where the requirements can be met, or ask whether lesser requirements can be used for certain resource types. In other cases, a user can obtain one type of resource, such as an amount of storage, independent or separate from another type of resource, such as an amount of compute capacity.

In at least some embodiments, fees are associated with the use of a PES, such that the PES may process requests on behalf of a user in exchange for payment of one or more fees by that user. For example, in some embodiments, fees may be charged to a user based on an amount and/or type of resource capacity allocated for a user, such as may be based on one or more of a number of processing units, an amount of memory, an amount of storage, an amount of network resources, etc., allocated to the user. In some embodiments, fees may be based on other factors, such as various characteristics of the resources used, such as, for example, based on CPU capabilities or performance, platform type (e.g., 32-bit, 64-bit, etc.), storage type (e.g., disk or flash), etc. In some embodiments, fees may be charged on the basis of a variety of use factors, such as a price per use of the service, a price per unit of time that computing services are used, a price per storage used, a price per amount of data transferred in and/or out, etc. In at least some embodiments, as discussed in more detail below, fees may be based on various other factors, such as related to availability of the program execution capacity (e.g., varying degrees of availability, such as guaranteed availability and/or variable availability) and/or various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. For example, in some embodiments, a user may be charged one or more fees in conjunction with use of dedicated resource capacity and/or functionality provided by a PES, such as fees that are respectively lower than fees associated with comparable use of an on-demand variable program execution capacity service of the PES. The lower fees may reflect, for example, the user entering into a long-term agreement for a specified use time period (e.g., a number of weeks, months, years, etc.), such as to pay one or more specific rates over the term of the agreement (e.g., up front and/or periodically). In addition, for example, tiers may be used for a specific type of functionality provided by a PES, such as to charge fees at a first tier for a first quantity of dedicated resource capacity functionality (e.g., up to a specified first threshold of resource nodes being used), to charge fees at a second tier (e.g., a lower price tier) for a second quantity of dedicated resource capacity functionality (e.g., above the specified first threshold and up to a specified second threshold of resource nodes being used), etc. Tiers may further be based on various factors other than quantity of functionality that is used in at least some embodiments, whether instead of or in addition to being based on quantity of functionality used. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

A use time window for a period of dedicated or reserved resource capacity may be specified in various manners in various embodiments, such as to indicate a specified period of time in which a user has access to dedicated program execution capacity (e.g., a number of days, weeks, months, years, etc.), a duration of time in which one or more programs may be continuously executed for a user (e.g., a number of hours the one or more programs may execute within any given period, such as an hour a day, an hour a week, etc.), a window of time in which one or more programs may execute (e.g., between 1:00 p.m. and 3:00 p.m. every other day), etc. As previously noted, in some embodiments an electronic marketplace may be provided for users of a PES, such that dedicated capacity users may provide some or all of their specified use time period for dedicated capacity to one or more other users in exchange for payment from those one or more other users, such that the one or more other users may use the provided portions of dedicated capacity to process requests and/or fulfill various types of operations on behalf of the one or more other users, and the dedicated capacity user may receive payment for such use. In other embodiments, a dedicated capacity user may temporarily provide use of some portion of the dedicated capacity for use by one or more users based in part on the one or more other users having an urgent need of the capacity, such as may be indicated by a willingness of the one or more users to pay a premium for use of the dedicated capacity (e.g., a rate greater than that paid by the dedicated capacity user), and in at least some such embodiments a portion and/or all of the fees collected from the one or more users may be provided to the dedicated capacity user.

A variable capacity user can interact with the PES Manager to configure and/or submit a control plane request specifying on-demand variable resource capacity, such as by submitting an instance request for immediate creation of a resource instance and/or providing information for later such creation. After a request for immediate execution is received, the PES Manager can determine whether there is a sufficient amount of resource capacity to satisfy the request, and if so the PES Manager can initiate the creation of the instance (or perform another such action). In cases where a user schedules an instance request for one or more future times, the PES Manager may attempt to reserve an appropriate amount of resource capacity for launching those instances at the one or more future times, and/or may delay the determination of which resources to use until a later time (e.g., such as when the one or more future times occur).

If the PES Manager is unable to allocate resource capacity for fulfilling a variable capacity user instance request, the request may fail, such that the request is not processed. In such cases, the user may resubmit a failed request for later fulfillment. As previously noted, in some embodiments a variable capacity user may be charged various fees in association with use of the PES, such as based on an amount or type of capacity used, a duration of time the capacity is used, etc. In addition, while not illustrated, some portion of the shared resources may be specified to provide the on-demand variable capacity, while in other embodiments the on-demand variable capacity may be provided in other manners (e.g., using all of the resource instances; using all of the resource instances that are not allocated for another purpose, such as for dedicated capacity; etc.).

In addition, a portion of the shared resources can be allocated for use by one or more dedicated capacity users, such that each of the dedicated capacity users can have priority access to capacity on at least some portion of those resources. For example, each dedicated capacity user may have one or more resource nodes dedicated for launching instances and/or fulfilling operations of that user during a specified use time period, such that the user may access the one or more resource nodes at any time during the specified use period on behalf of the user and/or may continuously utilize the one or more resource nodes for the duration of the specified period. As one specific example, one or more of the dedicated capacity users may enter into a long-term (e.g., 1 year term) agreement with the PES provider, such that each of those users has priority access to a dedicated amount of resource capacity over the term of the agreement in exchange for a fixed fee payment (e.g., upfront or periodically billed) and, in some cases, other use fees (e.g., variable fees associated with use of various resources, such as electricity, physical rack space, network utilization, etc.).

After a dedicated capacity user interacts with the PES Manager to obtain priority use of a dedicated resource capacity, the PES Manager may allocate one or more resource instances (e.g., resource nodes) for dedicated use by the user. In some embodiments, resource capacity is allocated for priority use by an associated specific dedicated capacity user for an entire use period. In other embodiments, rather than allocate specific resource capacity to specific dedicated users for an entire use period, the PES Manager instead allocates capacity from a dedicated group of resources, such that an appropriate amount of capacity to satisfy the requests from the various dedicated capacity users is available in the dedicated resource group. In some such embodiments, after an instance request is received for a dedicated user on one or more dedicated resources, an appropriate amount of capacity may be selected from the dedicated resource group at substantially the time of the received instance request. After the selected amount of resources is no longer needed for the dedicated user (e.g., after termination and/or completion of the request), those resource instances may be returned to the dedicated resource group for use by other dedicated capacity users, and in some embodiments may further be tracked as being available for use as part of a private pool of excess resource capacity for that dedicated user, as discussed below. In addition, after a use period for a particular dedicated capacity user expires, the one or more resource instances allocated for use by that user may similarly be released for use by others, such as by, for example, making the resource instances available to be allocated for use by one or more other (e.g., new) dedicated resource capacity users. In addition, the PES Manager may perform one or more various other management operations with respect to fulfilling instance requests, such as, for example, enforcing use periods and/or other restrictions associated with requests and/or users submitting requests, freeing-up resources to fulfill the requests, authorizing and/or authenticating the requests and/or the requesting users, etc. In some embodiments, a delay may be incurred between a time that a request on dedicated resource capacity and a time that the request is fulfilled, such as a delay period for performing various of the management operations, etc. In various other embodiments, resources for dedicated capacity users may be allocated, tracked, reserved and/or released using various other techniques.

In addition, multiple excess capacity users can interact with the PES Manager to configure and/or submit instance requests to be fulfilled using excess resource capacity of the PES. Such excess capacity users may include users who use private excess capacity pools and/or one or more general excess capacity pools. As previously noted, excess resource capacity may include excess and/or unused resource capacity (e.g., processing capacity, storage capacity, throughput, bandwidth, latency, etc.) that may be otherwise allocated for other uses, and in some embodiments may be separated into at least one general excess capacity pool that includes the excess resource capacity that is not in use as part of one or more other private excess capacity pools. For example, excess resource capacity may include a number of resource instances (e.g., resource nodes) that are otherwise allocated for other purposes (e.g., for use by dedicated capacity users, variable capacity users, and/or other users), but are not currently being used for those purposes. The excess capacity users may configure instance requests to be fulfilled in various ways, such as by specifying a number and/or type of resource instances to be used, a minimum and/or maximum number of resource instances to use, an expiration time for the fulfillment, a preferred time and/or period of fulfillment, one or more bids for payment of use of excess resource capacity (e.g., a bid per each use of a resource instance, a bid per use of a resource per some unit of time, a minimum and/or maximum bid, etc), etc.

A PES Manager (or similar module or component) can determine when to include and/or remove one or more resource instances from excess resource capacity that is available for use by excess capacity users, when to initiate and/or terminate fulfillment of instance requests for excess capacity users, and which resource instances to use to process the requests for excess capacity users. In addition, a PES Manager may further track how much excess resource capacity is available for each excess capacity user in private excess capacity pools for those users, such as for some or all excess capacity users that are also dedicated capacity users. In various embodiments, the PES Manager may determine that one or more resource instances are unused and/or or otherwise available for use by excess capacity users in various ways. For example, the PES Manager may receive indications from various users and/or entities that one or more resource instances are not being used or are otherwise available for use by excess capacity users, such as indications from one or more dedicated capacity users that they are not using some number and/or portion of the resource instances dedicated for use by those users. In some such embodiments, the dedicated capacity users may indicate one or more times at which dedicated resource instances are likely to be (or are) committed by the dedicated capacity users to be unused and/or available (e.g., particular times of day, particular days, periods of time, etc.). In addition, one or more other users may interact in similar manners to indicate that one or more resource instances, such as one or more resource nodes under the control of the one or more other users (e.g., third party computing systems, not shown), are available for use by excess capacity users.

In some embodiments, the PES Manager may automatically determine when resource instances are available for excess capacity users, such as by monitoring some or all of the instances and/or by tracking usage patterns of one or more users of the instances. In some such cases, determining whether resource instances are unused or otherwise underutilized may include determining and/or predicting a likelihood that the instances will remain unused for at least a period of time sufficient to process requests of one or more excess capacity users, such as may be based on an analysis of past usage patterns of one or more users. In various embodiments, a period of time sufficient to process instance requests of one or more excess capacity users may be based on one or more considerations, such as a time to stop/start fulfillment on behalf of users, a time to configure resources for use, a type of instance request (i.e., some types of request may perform useful amounts of work in short periods of time, such as various types of data processing, etc., while other requests use longer periods of time before useful results are produced), etc.

After it is determined that one or more resource instances are available for use by one or more excess capacity users, the instances can be added to a general pool of available excess resource capacity and/or otherwise tracked as being part of one or more private excess capacity pools, such that the instances may be used by the PES Manager for processing requests on behalf of corresponding excess capacity users until such time that other uses of the resource instances arise (e.g., priority usage by dedicated capacity users, variable capacity users, etc.). The PES Manager may further determine that one or more of the excess capacity resource instances is no longer available for use by excess capacity users. For example, the PES Manager may receive indications that one or more resource instances is no longer available, such as may be based at least in part upon explicit requests to stop use of the resource instances from a user that controls those instances, instance requests from priority users on the one or more instances, an expiration of a specified period of availability, etc. As another example, the PES Manager may automatically determine other uses for the resource instances, such as may be based upon received requests from one or more users that correspond to the other uses, or based on determining a likely demand for one or more resource instances (e.g., based on detecting an increased usage of other requests or processes for which the resources may be used, etc.).

In some embodiments, an excess capacity user may interact with the PES Manager to request immediate fulfillment of one or more launch requests on a specified number of excess resource instances and/or to schedule such fulfillment at one or more future times, such that the PES Manager may initiate the requested fulfillment on the specified number of excess resource instances if it is determined that the specified number of excess instances are available at the time of the requested fulfillment. The determination of whether the specified number of excess instances is available at the time may include first considering whether a private excess capacity pool (if any) for the user includes the specified number of excess resource instances, and selecting those excess instances for use if they are available. If only a subset of the specified number of excess instances is available in a private excess capacity pool for the user, the PES Manager may in some embodiments select those private excess instances to use in partially fulfilling the request, and attempt to obtain the remaining excess resource instances from the general excess capacity pool, or instead may proceed in other manners (e.g., fulfilling the request using only the subset of available private excess resources; indicating that the request fails because the private excess capacity pool does not include all of the specified number of excess instances; attempting to fulfill the request using only excess instances from the general excess capacity pool; etc.). In addition, an excess capacity user may interact with the PES Manager to configure one or more requests to be processed on a specified number of excess resource instances to be performed as such excess instances become available, such as during an indicated future period of time, and in some such embodiments the PES Manager may initiate the requested processing on the specified number of excess instances when the manager determines that the specified number of excess resource instances is available during that period of time. In some embodiments, an excess capacity user may specify a minimum and/or maximum number of excess resource instances to use for processing a request, such that the requested processing is initiated if the PES Manager determines that at least the minimum number of excess resource instances is available (whether from a private excess capacity pool and/or a general excess capacity pool), and the PES Manager may initiate the requested processing on up to the maximum (if specified) number of excess resource instances for the request based on availability of the excess resource instances.

After an instance request from an excess capacity user is received, the PES Manager may select which available resource instance to use for the instance request if the manager determines that there is an appropriate number of resource instances with sufficient resource capacity to process the instance request, whether from a private excess capacity pool and/or a general excess capacity pool. For example, the PES Manager may randomly select an appropriate number of excess resource instances from a pool of available resource instances. In other embodiments, instances may be selected on the basis of one or more other factors, such as, a predicted length and/or likelihood of continued availability of the resource instances, a physical proximity of the specific resource instances to one or more other resource instances, a geographic location of the one or more resources, etc. Furthermore, if one or more resource instances have been dedicated for use by a particular user, those particular instances may be the only ones used as part of a private excess capacity pool for that particular user.

As previously noted, handling of instance requests for excess capacity users on excess resources may be temporary, such that the PES Manager may automatically terminate instances when other preferred uses for the excess resources arise. In such cases, the instances may be automatically terminated (e.g., aborted, shut down, hibernated, etc.), such that the resource nodes are free for other purposes and no longer available for excess capacity users. In addition, as discussed in greater detail elsewhere herein, a processing state of those instance requests may be saved before the processing is terminated, such as to enable a later restart of the user instances. Furthermore, there may be multiple excess resource instances currently processing requests on behalf of excess capacity users that may be capable of satisfying the number of resource instances for the other purposes, and in such cases the PES Manager may determine which of the excess resource nodes to free for the other purposes based on various factors (e.g., by first reclaiming excess capacity instances from a private excess capacity pool of a user for use in fulfilling a request from that user for dedicated capacity use; or by using a determined priority among the current requests of the excess capacity users, such as based on time submitted, bid prices, etc.). In some embodiments, at least some of the terminated requests may have their fulfillment migrated and/or re-initiated on one or more other available excess resource instances (if any), such as immediately or at a later time. In some such cases, if there are not enough excess resource instances available to satisfy all of the current excess capacity users who have requests for processing, the PES Manager may determine to terminate fulfillment of one or more additional instance requests on one or more other excess resource instances such that the one or more instance requests initially terminated on the specific resource instances may be reinitiated on the newly freed excess instances. After the PES manger automatically terminates processing of a request for a user, the PES Manager may automatically re-initiate the instances for the launch requests as excess resource instances become available. At least some terminated requests may be automatically migrated and/or reinitiated on one or more other computing systems and/or program execution services with sufficient resources available to fulfill the requests, including one or more resources available via variable capacity functionality provided to variable capacity users, dedicated capacity functionality provided to dedicated capacity users, and/or one or more third-party computing systems (not shown) external to the PES.

In addition, various types of instance requests may be better suited for processing in such a temporary environment as provided by excess capacity pools, such as instance requests that are relatively tolerant of unexpected interruptions due to occasional termination. In some embodiments, excess capacity users may submit one or more instance requests on the excess capacity that are designed to intermittently track and/or save progress (e.g., intermediate results, current runtime state, etc.), so that the handling may be re-initiated at a future time. In addition, when the PES Manager automatically terminates instances on excess resource instances, the PES Manager may automatically detect the current system and/or state, such that the detected state may be saved and/or provided to a respective excess capacity user such that fulfillment can be resumed in a similar state. Alternatively, if a particular executing program corresponding to the request is able to save its own execution state, the PES Manager may instead notify the program to perform its own execution state save before terminating the instance.

As previously noted, a user having submitted a reservation request and received a private excess capacity pool can receive priority access to any resource capacity in that private excess capacity pool. If, however, the private excess capacity pool includes excess capacity that is not currently in use by the associated user for the private pool, that currently available excess capacity may be made temporarily available via a general excess capacity pool to other users. In addition, access to excess resource capacity from a general excess capacity pool for processing requests on behalf of multiple excess capacity users may be based on priority among the excess capacity users in at least some embodiments, such that if there is contention for some amount of the excess resource capacity between two or more requests, the request having a higher associated priority will be provided access to use the contended amount of excess resource capacity.

In at least one illustrative embodiment, an instance request with the highest bid amount (e.g., a highest maximum bid) is given priority over instance requests with lower bids, with ties between bid amounts able to be resolved based at least in part upon other factors (e.g., which request was received first). In some embodiments, one or more of the excess capacity users may interact with an embodiment of the PES Manager to bid (e.g., auction-style) on access to available excess resource capacity (e.g., currently available and/or available at one or more future times) of the general excess capacity pool, such that the user with the winning bid may receive the access to the available excess resource capacity. In some embodiments, the PES Manager can automatically terminate fulfillment of lower priority instance requests that are currently being fulfilled using excess resource capacity in favor of processing higher priority instance requests using the excess resource capacity. In some embodiments, such as non-priority based embodiments, the PES Manager can instead occasionally rotate through pending instance requests to fulfill using excess resource capacity, such that each instance request may be provided some amount of processing time.

In some embodiments, the PES Manager may provide interactive feedback to one or more of the excess capacity users that are interacting with the PES Manager to configure and/or request fulfillment using an amount of excess resource capacity of a general excess capacity pool. For example, interactive feedback may include indications of when and/or for how long instance requests may require indicated amount of excess resource capacity, as may be based at least in part upon current and/or predicted demand or usage. In one illustrative embodiment, the PES Manager may indicate suggested bid levels along with corresponding information indicating when processing will likely occur and/or complete, such that the excess capacity user may reconfigure (e.g., by specifying a different bid, a different amount and/or type of resource capacity, a different duration of processing, etc.) a request to meet the desires of the excess capacity user, such that the request may be processed at an earlier time, etc.

Figure 5:
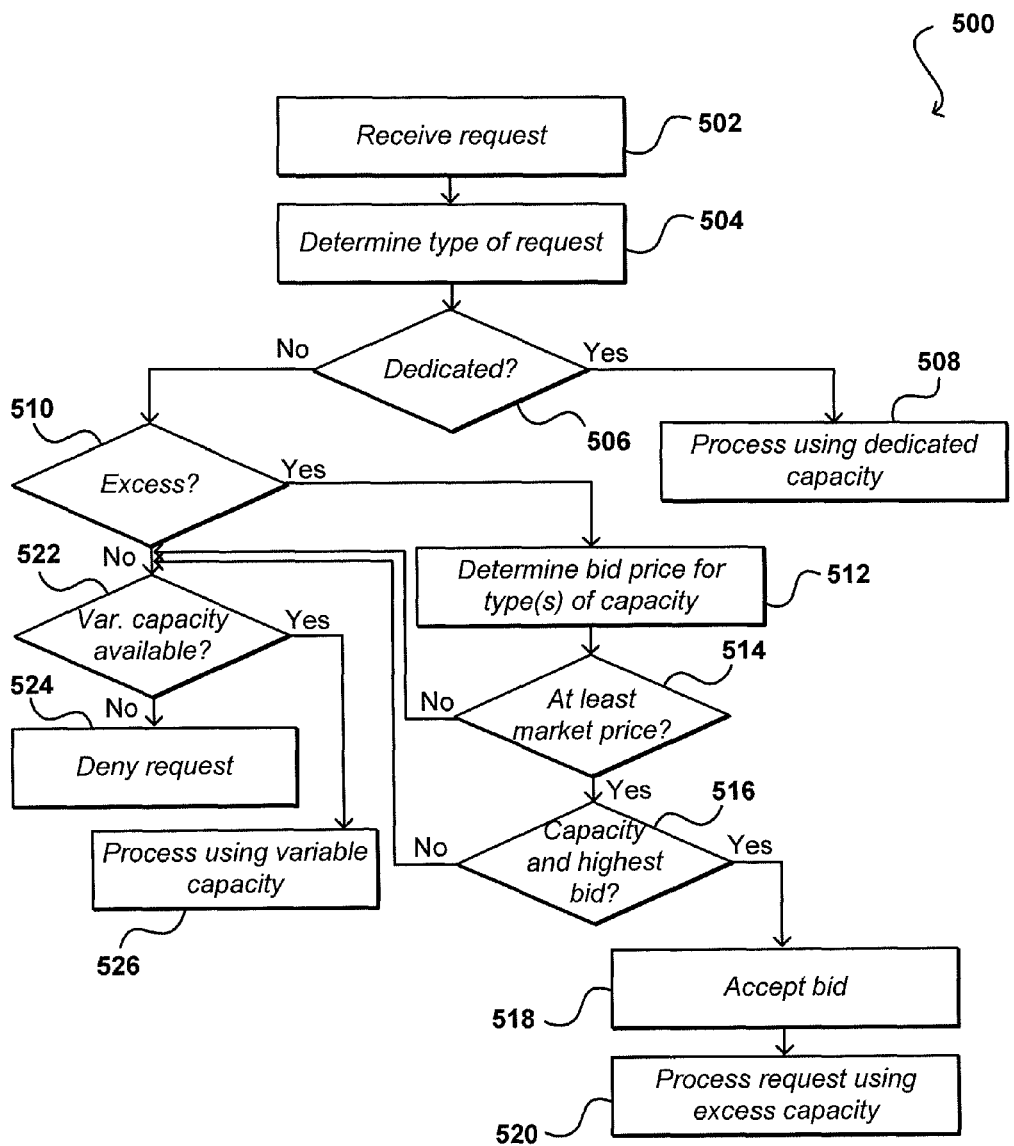
FIG. 5 illustrates an example process for fulfilling a request in accordance with one embodiment.

FIG. 5 illustrates one example process 500 for processing an instance request using some of the approaches discussed above. It should be understood for the various processes described herein, however, that additional, fewer, or alternative steps can be performed in similar or alternative orders, or in parallel, within the scope of the various embodiments unless otherwise stated. In this example, an instance request is received that is associated with a user 502. The association with the user can be determined through any appropriate technique, such as by determining an originating IP address of the request or determining a session identifier associated with the request. The type of instance request also can be determined 504. It should be understood that various determinations of the type of request can be performed as part of a single determination in various embodiments. As used in this example, the "type" of the instance request will correspond to whether the instance request is to be fulfilled using dedicated, excess, or variable capacity as discussed elsewhere herein, although other types of instance requests can be used as well. In at least some embodiments, a reservation request could have been previously received from the user in order to obtain dedicated or reserved capacity as discussed elsewhere herein. If the request is determined to be a dedicated capacity instance request 506, the instance request can be fulfilled (e.g., the appropriate instance(s) can be launched and maintained) using dedicated capacity storage 508 as discussed herein.

When a instance request is to be fulfilled using dedicated capacity, the PES Manager can first ensure that the corresponding dedicated capacity is not already in use or scheduled for use for other purposes. If sufficient dedicated capacity is not available, an error message or other similar response can be provided. The PES Manager can also ensure that the instance request was received within an appropriate use period, and/or may otherwise authorize the instance request (e.g., authenticate the request, authorize the subscriber user, etc.). The PES Manager can determine whether the allocated dedicated capacity to be used for the instance request is currently in use as part of fulfilling a prior request from the requester as part of a private excess capacity pool for the requester. If not, the service can fulfill the instance request using the dedicated capacity. In some embodiments, the "dedicated" requests can correspond to reserved capacity for the user, such that the user is able to utilize the reserved capacity without submitting a bid price as discussed elsewhere herein. In other embodiments as discussed elsewhere herein, reserved capacity is treated as a separate type of capacity, with separate determination rules, etc.

If the instance request is not a dedicated type, the determination might be made that the request is an excess capacity type of request 510. If so, the bid price for the request is determined 512. As discussed later herein, the bid price might depend on a number of different factors, such as various capacity levels provided by the currently available resources. For example, the user might submit a bid price for a rate of I/O operations that can be provided by the currently available capacity, but might submit a higher bid if the capacity also has a bandwidth value over a certain threshold. Various other options exist as discussed later herein. Once the bid price is determined, a determination is made as to whether that bid at least meets the current market price for capacity with the currently available attributes 514. If the bid price at least meets the current market value, it is also determined whether the bid price exceeds the bid price of other bidding users (or if the request otherwise has priority over the other pending requests) and whether the available capacity meets all the requirements for the bid 516, such as where the bid for the request requires certain capacity levels, such as a maximum average latency, without which a bid should not be accepted. If an acceptable type of capacity is available for the request and the bid price is acceptable, the bid for the request is accepted 518 and the instance request is fulfilled using excess capacity 520.

If the excess capacity corresponds to a private excess capacity pool, that private pool can be selected to receive the indicated excess capacity, and otherwise a general excess capacity pool can be selected. In some embodiments, multiple pools may be provided, as previously discussed with respect to private and general excess capacity pools, and/or in other manners (e.g., various different types of capacity may be available and grouped into corresponding private and/or general pools associated with the type of capacity). When an instance request is received to be processed using some amount of available excess capacity on behalf of an excess capacity, a corresponding private and/or general excess capacity pool is selected from which the excess capacity is to be obtained to process the request. In some embodiments, additional information for the request may include configuration information, such as indications of an amount and/or type of capacity requested (e.g., including minimum and maximum amounts), a bid amount (e.g., including minimum and maximum bid amounts), an expiration time, a particular excess capacity pool to use (e.g., only a particular private excess capacity pool associated with the user, or to use a particular private excess capacity pool if available but to otherwise use a general excess capacity pool), etc. In some embodiments, some or all such additional information may instead be included as part of a separate configuration and/or registration process performed by, or on behalf of, the excess capacity user. In some embodiments, feedback may be provided to an excess capacity user of one or more types, such as may indicate likely characteristics of the requested processing (e.g., a likely time that the request will be processed, a likely duration of processing, a likely excess capacity pool to be used, etc.) and/or optional other information (e.g., suggested configurations). The instance request can be added to a group of current instance requests for fulfillment on excess capacity for the selected excess capacity pool to be used. In other embodiments, rather than add the instance request to a group of other requests, the service may instead attempt to immediately satisfy the instance request, such as by determining whether there is available excess capacity to launch an instance at that immediate time (e.g., in a particular private excess capacity pool). As discussed, the excess capacity can be part of a pool of unused dedicated capacity or reserved capacity, such that the processing might be terminated at any time when a user with a higher priority submits a request to be processed using that capacity.

If the instance request is not a dedicated or excess type request, the capacity is not currently available for one of those types of requests, the bid price for the request is below market price, or for any of a number of other reasons the request is not able to be processed using dedicated or excess capacity, the instance request can be fulfilled using on-demand variable capacity. While the determination of request type might appear ordered or hierarchical from this example, it should be understood that there can be a single determination, concurrent determinations, or any other appropriate determination of result type, etc. For any such instance request, a determination is made as to whether there is any variable capacity available to handle the request 522. As discussed elsewhere herein, a instance request processed using variable capacity may receive no guarantees for the respective instance(s). If capacity is available, and if any minimum criteria for the request are satisfied, the instance requests can be fulfilled using the variable capacity 526.

When an instance request is to be processed using on-demand, variable capacity usage, it is determined whether the request is to be processed using currently available capacity (e.g., a current request for immediate processing, a previously scheduled request, etc.). As discussed elsewhere herein, such a request may specify various types and/or amounts of capacity with which to execute one or more programs on behalf of a variable capacity user. If currently available capacity is to be used, the instance request is fulfilled using the available variable capacity. If such capacity is not available, the user or other source of the request can be queried to determine whether to move the instance request to a queue for use with excess resource capacity, while such a move can be performed automatically in at least some embodiments and situations. In addition, in some embodiments one or more instances of excess capacity users can be terminated, in response to a request to launch instances on variable program execution capacity, in order to free variable program execution capacity. If capacity is not available and the request is not able to be moved for use with excess capacity, the request for variable capacity can be denied 524, and an appropriate response or error message can be sent to the user or other source of the request. Further detail for these and other steps in such a process can be found in co-pending U.S. patent application Ser. No. 12/686,273, filed Jan. 12, 2010, entitled "Managing Private Use of Program Execution Capacity," which is hereby incorporate herein by reference.

As previously noted, excess capacity users may be charged various fees in conjunction with use of excess resource capacity, such as may be based upon whether the excess resource capacity is part of a private excess capacity pool for that user, based on a quantity of resource capacity used and/or one or more use factors (e.g., number of times used, amount of shared resources consumed, amount of time capacity is used, etc.), and/or based on one or more bids from the one or more excess capacity users for use of the resource capacity. In some embodiments, a portion of the fees charged to the one or more excess capacity users who use a general excess resource capacity pool may be supplied to one or more other users who provided resource capacity in that general excess capacity pool (e.g., one or more dedicated capacity users, one or more other users, etc.). For example, various other users may be paid a proportional share of an amount of the fees collected from excess capacity users, such as a proportional share reflective of the amount of resource capacity contributed by the other users over time. In some cases, such fees supplied to the other users may be automatically credited and/or paid to the other users by the PES provider, such as to offset other charges incurred by those other users, such as charges incurred by dedicated capacity users.

In some embodiments, the PES Manager may provide an electronic marketplace (not shown) to one or more dedicated capacity users, such that the one or more dedicated capacity users may transfer access to their dedicated resource capacity to one or more other users during the use time period of the dedicated capacity, while in other embodiments a dedicated capacity user and another user may arrange an exchange in a manner external to the PES. In some embodiments, a user may provide payment to a dedicated capacity user in exchange for access to a transferred portion of the dedicated capacity user's dedicated resource capacity, such that the purchasing user may access the transferred portions of dedicated capacity to execute programs or process requests on behalf of the purchasing user. A price for the exchanged access may be determined in various manners in various embodiments, such as via a fixed price specified by the dedicated capacity user, a price that is bid or suggested by the user, etc. In some embodiments, an exchange for dedicated resource capacity may be made such that the exchange is temporary and/or permanent. For example, an exchange may be made for a specified limited period of time and/or various intervals of time, such that the purchasing user may access the resource capacity during that specified time and/or during the various intervals, after which the dedicated resource capacity may revert back to being dedicated for use by the dedicated capacity user. In some embodiments, the exchange can be permanent, such that the purchasing user may be provided with access to the dedicated resource nodes for any remaining use period associated with the dedicated resource capacity. In some embodiments, as part of the initial allocation of resource capacity for dedicated use by a subscribing dedicated capacity user, the PES Manager may assign one or more user tokens to the subscribing user and/or may otherwise associate the allocated capacity with the subscribing dedicated capacity user's account, such that the dedicated capacity user's use of the resource capacity may be tracked for various purposes (e.g., configuration, authorization, billing, etc.). In such embodiments, when a dedicated capacity user transfers a portion of their dedicated resource capacity to a new user, any provided tokens may be transferred to the new user and/or the portion of resource capacity may be otherwise associated with an account of the new user. In some embodiments, a provider of the PES Manager may further collect a fee in conjunction with a transfer of a portion of dedicated resource capacity from one user to another.

Although the foregoing example is described with respect to a PES that provides various types of functionality for various types of users, such as variable capacity users, dedicated capacity users, and excess capacity users, it will be appreciated that various other embodiments may exist, such as embodiments with or without one or more of the various types of users. For example, it will be appreciated that some embodiments may exist where a program execution service provides functionality for excess capacity users, but does not include variable and/or dedicated capacity users, such as where the excess program execution capacity is provided by one or more third-parties and/or affiliate entities associated with the PES, such as to allow such parties and/or entities to monetize otherwise unused resources. In addition, some of the techniques may be used in conjunction with a bid-based PES that allows users to submit requests for and/or to schedule execution of programs or processing of requests on a temporary basis on all of the resource capacity provided by the service, such that requests with higher priority at the time of execution are executed. In addition, it will be appreciated that the various types of user may each act as one or more of the other various types of user at times. As an example, a particular user who acts as a dedicated capacity user to process requests on dedicated resource capacity may also act as an on-demand variable capacity user, such as when the particular user desires additional resource capacity to process one or more requests for the respective user.

Further, in at least some embodiments unused resource capacity (e.g., unused portions of memory, unused bandwidth or throughput, etc.) may be made available for use by one or more excess capacity users, such that one or more instance requests of the one or more excess capacity users can share a resource with a dedicated capacity user and/or other excess capacity users. In some embodiments, at least some of the resource capacity that is allocated for use by dedicated capacity users may be made available for use by one or more variable capacity users, such as if it is determined that such access is unlikely to impact dedicated capacity users (e.g., in cases where accurate predictions of upcoming demand can be forecast, etc.). Furthermore, if some amount of resource capacity dedicated for use by one or more dedicated capacity users is oversubscribed (e.g., oversold, and/or provided to one or more other long term users), such that the oversubscribed capacity is unavailable for the one or more dedicated capacity users at a time that those users request use, then one or more of the requests being processed using the oversubscribed resources may be migrated to one or more other resource instances, such as may be available in one or more remote data centers and/or other computing systems.

It should be understood that even though examples discussed herein refer to a program execution service and resource capacity, the described techniques can be used to manage access to various types of computing-related resources discussed herein, and can process requests not related to a user-specific program or application. A non-exclusive list of examples of types of computing-related resources and resource capacity that may be managed for use by multiple users includes the following: persistent data storage capabilities (e.g., on non-volatile memory devices, such as hard disk drives); temporary data storage capabilities (e.g., on volatile memory, such as RAM); message queuing and/or parsing capabilities; other types of communication capabilities (e.g., network sockets, virtual communication circuits, etc.); database management capabilities; dedicated bandwidth or other network-related resources; guaranteed rates of IOPS; maximum latency guarantees; input device capabilities; output device capabilities; processor (e.g., CPU) cycles or other instruction execution capabilities; etc. In one example, a user may request one or more indicated types of computing-related resource capacity, and the PES system can automatically determine an amount of each indicated type of resource capacity (e.g., based on an explicit quantity or other amount indicated by the user in the request, based on predetermined amounts associated with particular resource types, based on available amounts of the indicated resource types, etc.) to provide for the user, such as a first amount of volatile memory and a second amount of minimum bandwidth.

Figure 6A:
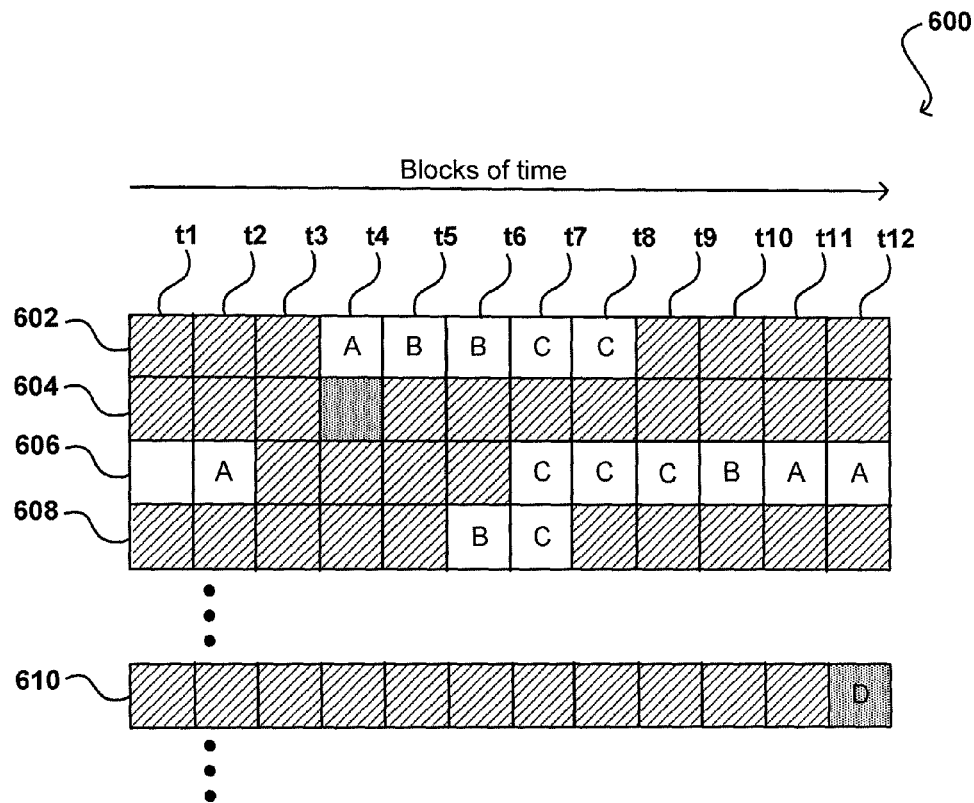
FIGS. 6(a) and 6(b) illustrate approaches that can be used for accepting bids in accordance with various embodiments.
Figure 6B:
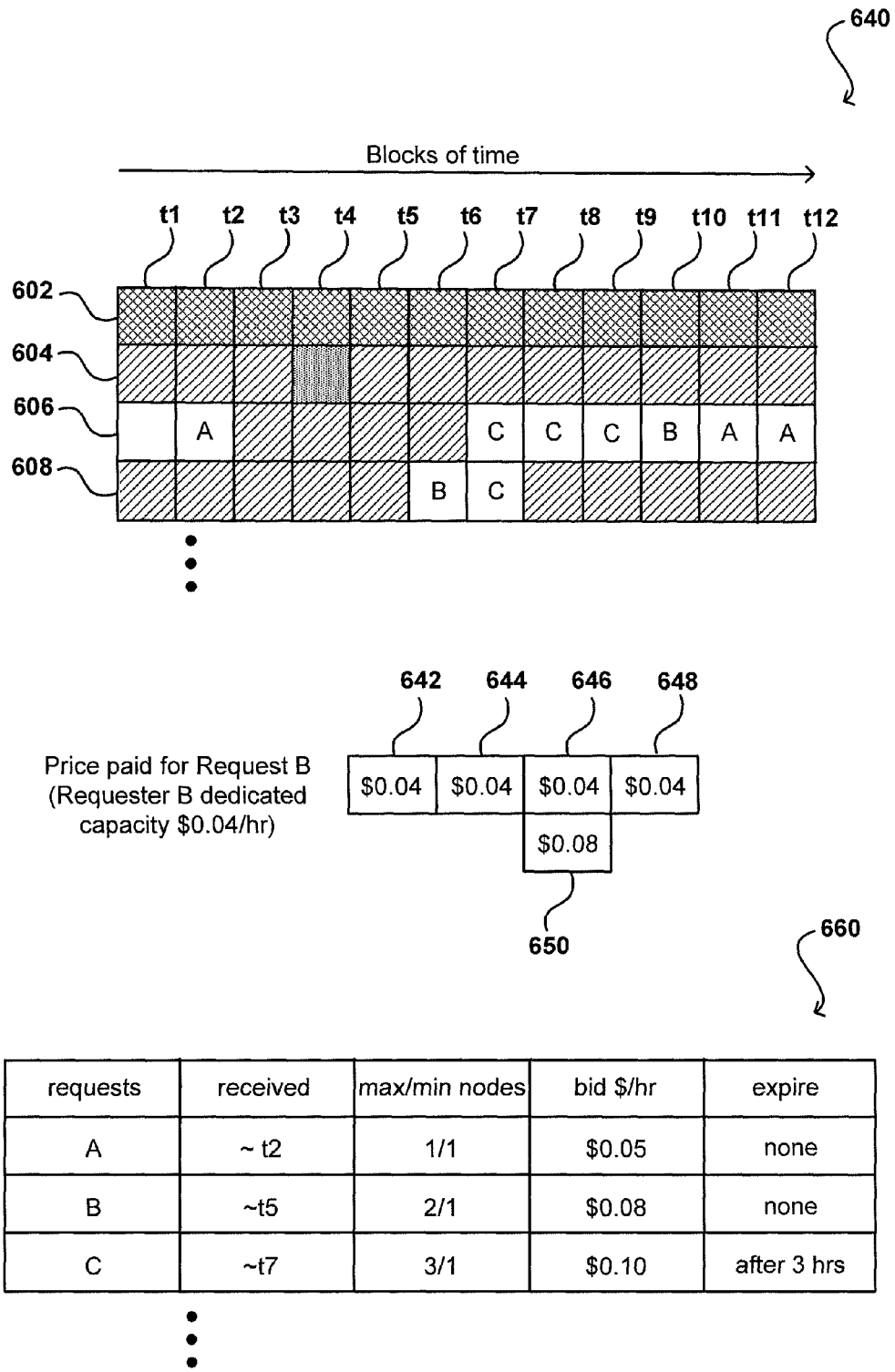

FIGS. 6(a) and 6(b) illustrate an example approach to managing excess resource capacity, such as may be automatically performed by a PES Manager in at least one embodiment. In this example, the resource capacity will be described with respect to a plurality of resource nodes operable to fulfill instance requests and I/O operations, or perform other such tasks, with certain levels of throughput, bandwidth, and other such functional aspects. It should be understood, however, that any other appropriate resource can be managed using such an approach in accordance with various embodiments.

FIG. 6(a) illustrates a situation wherein instance requests from four users (A, B, C, and D) are received, where the system manages those requests using excess resource capacity from a general excess resource capacity pool. In this example, none of the users submitting requests have an associated private excess resource capacity pool. A first table 600 of information indicates usage of each of a plurality of resource nodes with respect to time, with the resource nodes including both dedicated nodes 602, 604, 606, 608 and non-dedicated nodes 610. As discussed, the usage of each node can be managed by a PES or other appropriate system or service for each consecutive block of time (t1-t12). Further, a second table 620 of information indicates information about instance requests for users A, B, C and D received by the program execution service to be processed using excess resource nodes of a general excess resource capacity pool. As illustrated, information for each instance request can include the time that the request was received, the maximum and/or minimum number of nodes required to fulfill the request, the bid amount, and an expiration time for the request. As should be understood, any appropriate alternative or additional information can be used as well.

Information contained in the second table 620 can be used by the PES Manager to determine when and how to process each instance request based at least in part upon the usage indicated in the first table 600. In the first table, blocks of time having a fill pattern of horizontal lines are in use for other instance requests, and thus not available as excess capacity. A block of time without any patterning indicates a respective resource node being available for use as excess program execution capacity during that interval of time. A block of time containing a letter indicates that a request or program is being processed or executed on the respective resource node during that period of time, where the resource node during that time offered excess capacity. The length of time of each block can be any appropriate period of time, such as ten minutes, an hour, a day, or any other appropriate period.

As illustrated, instance request A was received at a time that approximately corresponds to time block t2 (e.g., just before or during the corresponding time interval), indicating a preference to execute on a single excess capacity resource node, with a bid price of $0.05 per hour of use of the single excess resource node and no specified expiration (e.g., indicating that the request is to continuously execute and/or re-execute until execution or processing is completed). In this example, each fulfillment may provide approximately the same amount of resource capacity (throughput, bandwidth, latency, etc.) per time interval, while in other embodiments the capacity of the various nodes can vary with respect to at least one functional aspect (e.g., storage capacity or maximum rate of I/O operations) suck that a request might also specify at least one minimum or preferred aspect of a node to be used in processing the request. In other embodiments, the various requests may be configured in other ways, such as to include one or more of a specified particular type of resource node to use (e.g., and/or characteristics of such resource nodes), a minimum and/or maximum bid amount, and/or one or more other configurations (e.g., fault tolerance requirements, execution locality and/or proximity preferences, etc.). In addition, other types of information may be indicated in some embodiments, such as one or more particular programs to be executed for each request, a total amount of aggregate resource node time intervals for the request, etc.

The first table 600 includes a number of dedicated capacity resource nodes 602, 604, 606, 608, which may include resource nodes that have been allocated for dedicated access to one or more specific dedicated capacity users. The table also includes one or more non-dedicated resource nodes 610, which may be available for other types of resource capacity (e.g., on-demand variable capacity). In one example, a dedicated capacity user (not shown) may have priority access to a specific resource node 602 for a specified period of time (e.g., a year), such that the user may access the dedicated node 602 to launch instances and fulfill I/O operations on behalf of the user at any time during the specified period of time, although such access may be subject to a delay period and/or one or more interactions on the part of the user to gain access (e.g., notifications of an intent to use the resource node 602 at a particular time, a request to execute programs on the resource node 602, etc.). In other embodiments, the dedicated capacity user (not shown) may instead have priority access to a resource node with equivalent computing resources as the dedicated resource node 602 (e.g., equivalent processing capacity, memory, bandwidth, etc.), but not have a particular allocated resource node, such that the user may be provided access to any of the resource nodes that are equivalent to the dedicated node and that are available for use. In various embodiments, the PES Manager can ensure that a sufficient number of equivalent dedicated resource nodes is available for use by dedicated users who may have priority access to such nodes in various ways (e.g., maintaining a group of such resource nodes and/or otherwise reserving a specific amount of such nodes, etc.).

During time intervals t1-t2, dedicated node 606 is determined to include excess capacity (in at least one functional aspect), such as may be based on being unused by a dedicated capacity user to whom the resource node is allocated. During this period, the node 606 can be made available for use by excess capacity users. In some embodiments, the dedicated capacity can indicate to the program execution service that the resource node is available for excess capacity, such as at some time prior to time interval t1. In some embodiments, the PES Manager cab automatically determine that at least one aspect of the resource node 602 is not being used. In the illustrated example, all the other resource nodes 604, 606, 608, 610 are not determined to be available during that time interval. When instance request A is received around time interval t2, the PES Manager determines to process the request using the excess capacity available on resource node 606. At the time, there are no other pending instance requests from excess capacity users, so there is no other bid to compare and the user-specified fee of $0.05/hour is accepted for processing of request A on node 606. In some embodiments, the program execution service may utilize a fixed price (or other designated) fee when there are no competing bids.

At time interval t3, the program execution service determines that the resource node 602 is no longer available to satisfy excess capacity requests (e.g., based on an indication received from a dedicated capacity user reclaiming use of the resource node), whereby the processing associated with instance request A is terminated on that resource node 602. At interval t4, the PES Manager determines that two resource nodes 602, 604 with sufficient resources to execute instance request A are available as excess capacity nodes, and determines to reinitiate processing for request A on dedicated node 602. In some embodiments, node 604 might not be selected if it is indicated that node 604 is available, but not preferred, for excess capacity use. In some cases, a dedicated node user might pay extra to always have the node available without any pending requests, tasks, or applications of other users. In other cases, a resource node may not be preferred for various reasons, such as the node having a short and/or uncertain duration of availability (e.g., as determined by the program execution service, such as may be based on indications from the dedicated capacity user to whom the node is allocated, based on prior history of use, based on forecasted use, etc.). In some embodiments, the program execution service may have a preference for selecting a resource node with a longer likely availability for executing a request of an excess capacity user, such as to minimize having to stop and restart processing on the various resource nodes. If another request was received at substantially the same time, however, the service could determine to use node 604 to process that additional request.

In this example, instance request B is received around interval t5, when there is only one excess resource node 602 available. Because there is only one node available for two instance requests, the service must determine which request to process on that node during the time interval t5. In this example, the bid amount for request B ($0.08/hour) is higher than the bid amount for request A ($0.05/hour), such that the program execution service determines to terminate the processing of request A in lieu of request B. Other reasons for favoring one instance request over another can be used as well, such as where one instance request is associated with a higher priority than another request, etc. In this example, instance request B is processed continuously on the dedicated node 602 for a fee of $0.08/hour over the time intervals t5-t6. Further, at time interval t6 there are two resource nodes are available as excess resource nodes, each having sufficient resources for processing request B. Since instance request B specifies a maximum of two resource nodes, and has a higher bid amount that request A, request B can continue to be processed using node 602, and also be processed using node 608, with request A remaining terminated for the time being.

At time interval t7, three dedicated resource nodes 602, 606, 608 are determined to be available as excess capacity resource nodes, and instance request C is received. In this embodiment, fulfillment of instance request B is terminated on dedicated resource nodes 602 and 608, and portions of instance request C are fulfilled on all three of the available excess resource nodes based on request C having an indicated preference to execute on a maximum of three nodes and having a higher bid amount (e.g., $0.10/hour) than requests A and B, thus providing a higher priority for instance request C than for requests A and B. At time interval t8, one of the dedicated nodes 608 is determined to no longer be available as an excess resource nodes, with the node having been reclaimed or otherwise having become unavailable. The portion of request C being processed on that node are terminated, but the portions on nodes 602 and 606 continue processing. Node 602 similarly becomes unavailable at t9, with request C only being processed by node 606. In this example, request C specified termination after three hours, such that processing of request C is terminated after time t9. Since processing of request B has not been completed and B has a higher bid price than request A, the processing of request B is reinitiated on the single available resource node 606.

During time interval t10, the processing of instance request B ends (e.g., based on the associated program(s) completing their execution after five aggregate hours of execution, or instead based on an instruction received (not shown) to cancel request B from the excess capacity user who submitted request B), and instance request B is treated as no longer being a pending request to be satisfied. In addition, at or near this time, instance request D is received with having a bid amount equivalent to previously received instance request A ($0.05/hour). In this case, assuming no other priority information, the PES Manager can determine to reinitiate fulfillment for request A on available dedicated resource node 606 at next time interval t11 rather than for instance request D, based at least in part upon request A having been received at an earlier time than D and/or already having at least a portion of the processing completed. Request A can continue to be processed on node 606 until some point in the future when the processing is completed or one of the other situations discussed herein occurs.

At interval t12 one of the other resource nodes 610 becomes available for use as excess resource capacity. The node might be a non-preferred excess capacity resource node, but request D is nonetheless processed using that node 610 since no other excess resource nodes are available for interval t12.

At least one component of the program execution service can be configured to track usage of the resource nodes for each user, such that each user is charged an amount of fees commensurate with the bid amounts and periods of usage. In addition, the program execution service may also track which of the resource nodes were used and/or were made available for use by excess capacity users, such that one or more dedicated users associated with those resource nodes may be given some portion of the fees collected from the excess capacity users.

FIG. 6(*b*) illustrates a similar situation, but where one of the users (here user B) has a private excess resource capacity pool. The information displayed in the tables 640, 660 reflect the changes due to the use of the private excess resource capacity pool. In this example, user B is a dedicated capacity user, and has been allocated the dedicated use of a resource node 602 for a time period that includes time intervals t1-t12. The fill pattern for node 602 has been adjusted in this FIG. 6(*b*) to indicate that any unused capacity of this resource node 602 is available for use as a private excess capacity pool for user B. In this example, the time intervals of t1-t3 and t9-t12 for resource node 602 correspond to dedicated use of the node by user B, and the resource node 602 is available during the time intervals of t4-t8 for use as part of the private excess resource capacity pool for user B. As discussed in greater detail elsewhere, requests from user B have priority for use of the private excess resource capacity pool.

The assignments for time intervals t1-t6 are the same in FIG. 6(b) as in FIG. 6(a). For example, instance request B was already assigned to use resource node 602 for time intervals t5-t6, based on request B having a higher priority for the general excess resource capacity pool in than request A. However, after instance request C is received for time interval t7, the assignments change in FIG. 6(b) relative to FIG. 6(a) based on the use of the private excess resource capacity pool for user B. In particular, in FIG. 6(a) instance request C was given higher priority than instance requests A and B for the general excess resource capacity pool, and thus all three excess resource capacity nodes available at time interval t7 in FIG. 6(a) began to process portions of request C. With respect to FIG. 6(b), however, instance request B continues to have the highest priority at time interval t7 for the excess resource capacity in user B's private excess resource capacity pool. Accordingly, the program(s) for request C begin to execute on the other excess resource nodes 606 and 608 at time interval t7 in FIG. 6(b), but the program(s) for request B continue to execute on resource node 602 at that time interval in FIG. 6(b) in a manner different from that of FIG. 6(a). In particular, since an instance request from user B is available at time interval t7, that request (in this example, request B) is given priority to use the excess resource capacity of resource node 602 that is part of user B's private excess resource capacity pool. Similarly, at subsequent time interval t8, if the program(s) for request B had continued to execute, those program(s) would have continued to execute on resource node 602 for the same reasons. However, in this example request B ends after five aggregate hours of processing, such that the excess resource capacity for resource node 602 at time interval t8 returns to the general excess resource capacity pool, and the program(s) of request C begin to execute on the resource node 602 for time interval t8.

The use of such a private excess resource capacity pool can provide a user with various benefits. For example, a request from that user can be completed more rapidly using the dedicated pool, as is evidenced by instance request B being completed at interval t7 in FIG. 6(b) and interval t10 in FIG. 6(a). In some embodiments, request B can be performed more cheaply for user B in the second situation, as the private excess resource capacity pool for user B is charged to user B at the same rate as the incremental ongoing cost of using the dedicated resource node 602, which in this example is $0.04 per time interval hour for the dedicated usage. The performance of instance request B in FIG. 6(a) would have cost the bid price for request B of $0.08 per time interval hour (i.e., twice that amount for each time interval hour as the incremental on-going cost of using dedicated resource node) for each of the five aggregate hours of processing. The only period for which user B did not get the lower dedicated rate was when request B was processed using node 608 during interval t6, where user B was charged the bid amount of $0.08 as in FIG. 6(a). Thus, the total cost for performing request B in FIG. 6(b) is $0.24, while the total cost for performing request B in FIG. 6(a) is $0.40. While the absolute numbers are small in this example based on the limited amount of use of excess resource capacity, it will be appreciated that increasing such excess resource capacity by a significant amount in a real-world situation may result in correspondingly larger actual cost savings (e.g., if use is increased a thousand-fold, the corresponding savings would be ~$1600 in this example, based on actual costs of $2400 rather than $4000).

Furthermore, in other situations instance request B may be fulfilled for even lower cost than illustrated in the example of FIG. 6(b). For example, in FIG. 6(b) one of the five aggregate hours of processing for request B (i.e., 20% of the total aggregate hours) was performed using the general excess resource capacity pool (i.e., use of the time interval of t6 for resource node 608), and an otherwise available hour from the private excess resource capacity pool (i.e., time interval t8 for dedicated resource node 602) was not used. In some embodiments, user B may specify that request B (and/or any other requests for user B) is only to be executed using user B's private excess resource capacity pool, rather than to also use the general excess resource capacity pool as a supplement to the private excess resource capacity pool, such that user B would be charged the lower fee for each unit time of processing. Increased usage of the private excess resource capacity pool also may be triggered by, for example, by request B specifying a maximum of one resource node (so that only the private excess resource capacity pool is used if it is available).

In some embodiments, the private excess resource capacity pool can be used in other manners to provide additional benefits. For example, instance request B in FIG. 6(b) might have a higher priority than instance request C for use of the general excess resource capacity pool (e.g., if request C has a bid price of $0.07 rather than $0.10). Further, request B might use six aggregate hours to complete processing rather than five, and request B might specify to use a maximum of one resource node rather than two. In such a situation, and using the allocation scheme previously described for FIG. 6(b), request B would not be selected to use resource node 608 in time interval t6 from the general excess resource capacity (given the maximum of one resource node and the preference for using the private excess resource capacity pool), but would be selected to continue to use resource node 602 in time interval t8 from the private excess resource capacity pool. However, in that situation, request B would still have one additional hour of processing to complete at the end of time interval t6, but the availability of resource node 602 in the private excess resource capacity pool at time interval t9 would disappear based on the resumed use of dedicated capacity by user B at that time interval.

On option in such a situation would be to terminate the instance(s) for request B on resource node 602 at the end of time interval t8, and to immediately reinitialize the instances for one additional hour on resource node 606 during time interval t9. In some embodiments, in order to avoid the overhead of terminating and then restarting the instances for request B when only a short time remains until completion, processing for request B could instead be allowed to complete on resource node 602 during some or all of time interval t9. While user B's desire to resume dedicated capacity use in time interval t9 could be deferred in this situation, an alternative that accommodates resumption of dedicated capacity use in time interval t9 includes selecting another resource node to temporarily use for user B's dedicated capacity use during at least time interval t9, such as resource node 606. In this manner, user B receives the desired dedicated capacity use in time interval t9, and the processing of request B is allowed to complete more efficiently and quickly. Nonetheless, the use of resource node 602 during time interval t9 for the completion of the processing for request B may not be treated (for cost purposes) as being part of the private excess resource capacity pool, such that user B may receive the dedicated capacity use price of $0.04 for the use of resource node 606 during time interval t9, but the execution of the program(s) for request B using resource node 602 during time interval t9 may be charged at the general excess resource capacity pool price of $0.08 to reflect request B's bid price. It will be appreciated that other alternatives may similarly be used in other embodiments and situations.

In addition, node usage and allocation may differ in other embodiments where the nodes do not have equivalent resource capacity (e.g., bandwidth, IOPS, latency, compute, etc.) and/or characteristics (platform specification, etc.). In some such embodiments, various requests can include indications of one or more specific types of resource node for use in fulfilling those instance requests, and those requests may only be fulfilled using the corresponding specified type of resource node. Further, rather than excess capacity being based on unused dedicated resource nodes and other resource nodes as illustrated, embodiments may exist where only one group of resource nodes and/or additional groups of resource nodes may contribute to excess capacity resource nodes available for executing requests of excess capacity users. Furthermore, in some embodiments, at least some of the resource nodes may include resource nodes provided to the program execution service by one or more third parties.

In some embodiments, users might submit multiple bids that are based upon multiple types and/or combinations of resource capacity. For example, a user might be willing to bid $0.04/hr for a node of compute capacity if that node can provide at least 100 IOPS, but might be willing to bid $0.06/hr for a node of compute capacity if that node can provide at least 200 IOPS. In another example, the user might bid $0.06/hr for 200 IOPS, and might not care how many nodes need to be used to provide that rate of IOPS. There can be various other criteria or options that a user might use to bid for resource capacity.

For example, consider the examples illustrated in FIGS. 7(a) and 7(b). For simplicity these examples do not include information such as number of nodes and expiration time, but it should be understood that such information can be utilized as well using approaches discussed elsewhere herein. FIG. 7(a) illustrates a first example 700 indicating how a user might submit bids based on multiple capacities or functional aspects of various shared resources. In this example, a user is able to provide bid amounts for two different levels of service for each of four different capacity areas, although different numbers of bids and selections of capacities can be used in other embodiments. In this example, the user has submitted bids that are higher for compute capacity B (e.g., a server with a greater number of processors) than for compute capacity A. As illustrated, the user also is willing to bid more, for most combinations, for IOPS rate B than IOPS rate A. The user on average is not particularly worried about latency, such that the user is not willing to bid more for a resource that has a shorter amount of maximum latency. It also can be seen that the user is not willing to bid anything for resources with bandwidth rate A, and is only willing to submit bids for bandwidth rate B, such as where a user application requires a minimum bandwidth greater than bandwidth rate A.

Such information can be used to generate bid amounts for a user instance request based on one or more aspects of an available resource. For example, consider a resource node becoming available as excess capacity that has compute capacity A, IOPS rate A, bandwidth rate B, and maximum latency B. Using a set of bids such as that illustrated in FIG. 7(a), an appropriate bid amount can be determined using any of a number of different algorithms. For example, in one embodiment the algorithm can select the highest bid amount for the available resource. For example, the set of bids indicates that the user is willing to bid $0.06 for resource capacity when that resource has both maximum latency B and IOPS rate A. In one embodiment, the system would select a bid of $0.06 for the user. In another embodiment, the system might look at the minimum bid for the resource, as the other combinations for this resource have an associated bid price of $0.04, such that a bid price of $0.04 might be selected. Other embodiments might take an average, weighted average, or other combination to produce a value that might be rounded off to the nearest cent (or other appropriate value). In this case where the values range from $0.04 to $0.06 for the combinations of resource types, the final bid value might be $0.05 after computation.

FIG. 7(b) illustrates a set of bid values 750 that can be used in accordance with another embodiment. In this example, there can be a default compute capacity (e.g., a standard server or compute device offered by the service) and a user can submit a default bid price ($0.04 in this example) to be used for the default type of resource. The user can also specify bid adjustment values to be used when resources with certain capacity values or types become available. For example, if a resource becomes available with increased compute capacity B, the user might be willing to increase the bid amount by $0.02/hr. The user might not be willing to adjust the default bid price based on IOPS, such an adjustment value of zero (or another such value) is entered. In this example, the user will not bid for bandwidth below bandwidth rate B, and thus has entered a "no bid" value for bandwidth A such that no bid will be used if a resource becomes available without at least bandwidth value B. Another approach that can be used as opposed to a bid increase value is to use a bid decrease value. In this example, the user prefers not to use a resource value with maximum latency value A, such that the user has indicated a negative bid adjustment of $0.01, such that if a default resource becomes available with only maximum latency A, the bid amount can be calculated to be $0.03. Various other such approaches can be used as well as should be apparent to one of ordinary skill in the art in light of the teachings and suggestions contained herein.

It should be understood, however, that a system might not always select the highest bid for an available resource. In some embodiments, there might be a pool of users requesting excess capacity where at least some of those users have a different set of bid prices. As discussed above, some users might be given priority based on a type of user, a type of access requested, and whether the user has at least a portion of a request already processed. For example, if a user has a request almost completed with a bid price of $0.04, and there is another user with a bid price of $0.05 but that user's request has not yet started processing, the system might be configured to attempt to complete the first request first, even though the bid price is lower. Such an approach can attempt to optimize on aspects such as throughput or latency as opposed to price.

In some embodiments, a PES Manager might look to the type of resources available. For example, if there is a limited number of high processing capacity devices, the device might attempt to process requests with bid adjustments for high processing capacity devices even though there might be other requests pending with higher bid amounts. For example, consider request A with a default bid of $0.04 and a bid adjustment of $0.02 for higher compute capacity resources. Also, consider request B with a bid of $0.08 for any type of compute capacity. If a node becomes available with a high compute capacity, the PES Manager might decide to process request A instead of request B, as the system will make more money by processing request A with the higher capacity resource and processing request B with the next available resource (which will not affect request B's bid price). Various other such examples can be imagined in light of the present disclosure, such as where users are given priority based on bandwidth, latency, or other such aspects as opposed to, or in combination with, bid price.

In one example, a user might submit a rights request to the PES service for a level of reserved committed IOPS, wherein the user requests the ability to create volumes (at a reduced price) that have 20,000 committed IOPS over the next three years. For example, the user might want to reserve a level of IOPS in case the user has to perform disaster recovery or another such process. Such a user might reserve capacity in two separate geographical areas in case of a data center failure or other such even, such that the user launch instances in another geographical area if one area becomes unavailable, but might only use operate in one of those geographical areas during normal operations. The user could alternatively request volumes with a total committed IOPS of 20,000 over the next three years, and could pay more for the dedicated volumes than for the dedicated ability (or reservation) to create those volumes over the same period, whether the user actually uses the capacity or not. A user with such a reservation then can be guaranteed to be able to create a volume with up to 20,000 IOPS when the user actually attempts to create the volume, and can be charged a slightly larger amount than would be charged for on-demand committed IOPS. A user with reserved capacity in at least some systems is not charged when the user does not have active reserved committed IOPS volumes during the reservation period, such that the user is incentivized to destroy volumes when those volumes are not being used, which can free up excess capacity for other users or at least reduce the number of devices needed to provide the necessary capacity for all users.

A user with dedicated and/or reserved capacity might not be using all of that capacity at all times, such that other users can potentially be able to utilize at least a portion of that unused capacity. For example, if the dedicated user with 20,000 reserved IOPS is only using 10,000 IOPS, then another user wanting a volume with 100 committed IOPS can, in at least some embodiments, utilize the unused capacity (the "remnant" capacity) from the dedicated user. Further, the other user can submit a bid per month (or other appropriate period as discussed elsewhere herein) to utilize that unused capacity when available. The rate charged for usage of remnant capacity can be less than would be charged for dedicated or other types of capacity, as a remnant user might have processing terminated, paused, moved, or otherwise interrupted if the dedicated user for that capacity begins or resumes using that capacity. The dedicated user can set minimum bids for usage of the remnant capacity in some examples, or can use a dynamic bidding process in order to charge whatever the market will yield at a particular time. In some embodiments, a bidder can indicate a maximum price, and if that bid is above at or above a currently determined market price and there is available capacity, the bid can be accepted as discussed above.

As discussed above, an excess capacity user can submit multiple bids based on other aspects of the resource capacity, such as a base bid of $0.04/hr for the 100 IOPS and a bid of $0.06 if the bandwidth is also above 100 mbps. The base bid also can have minimum criteria for the other capacity values, such that the excess capacity user will not provide a bid if the resource cannot provide at least 50 mbps. In some embodiments, the system can provide various bid "packages" wherein a user can provide bids for fixed combinations of capacity values, such as compute capacity, storage capacity, IOPS, bandwidth, latency, and/or other such aspects. A user might accept a lease for a certain amount of throughput, and there also can be various levels or "tiers" of service that people bid against. In some systems, a user can request a minimum capacity (such as 100 IOPS) and bid for improved capacity, such as up to 1000 IOPS. The user in some embodiments could bid for IOPS (or other capacity types) in increments, such as increments of 100 IOPS. Various rules and policies can be used to govern the bidding, acceptance, and usage of the capacity, such as to optimize for resource usage or overall revenue as discussed elsewhere herein. For example, the system could adjust the market price downward such that more bids are accepted, in order to increase resource usage until the system reaches a threshold level of usage or other such target. In some cases a higher bid will always be accepted before a lower bid, while in other cases a request with an overall higher profit will be accepted first or requests will be received to optimize throughput, etc. Users can be provided with historical data to help with setting bid prices, such as may be based upon historical data approaches used for conventional bidding processes known in the art.

In some embodiments, a user having a bid accepted for excess capacity can receive a guarantee that the user will be allowed to use that capacity for at least a minimum period of time, such as 15 minutes, an hour, etc., whereby a dedicated user for that resource cannot reclaim that capacity until at least that guaranteed period of time has passed. In some embodiments, the market price can be adjusted at each such period, such as every 15 minutes, and the user's bid can be reevaluated such that if the bid price is no longer at market value, the use of that resource by the excess capacity user can be terminated. If a user with a compute instance has use terminated, for example, that instance can be turned off, while users with data volumes can have the volumes destroyed upon termination. In some cases, a snapshot of the data volume will be taken before the data volume is destroyed, whereby the volume can be recreated at a later time or the data can otherwise be recovered. If the user has a level of throughput, bandwidth, or latency terminated, that user could be downgraded to a lower level of service, such as an uncommitted level of service instead of a committed level of service, such as where a user would get a rate of IOPS or bandwidth based upon the resources available at that time.

In some embodiments, a user can potentially pay for "bursts" of resource usage. A burst as used herein refers to a temporarily increased amount of resource usage, where a user goes over the allocated amount of capacity for up to a specified period of time. In this case, the user is essentially reserving capacity, but might be able to pay less for the additional capacity than for reserved capacity when the user agrees that the usage will be for at most a specified period of time, such as 15 seconds, one minute, etc. In such an instance, processing for an excess capacity user or other such user might be temporarily suspended to allow for the burst of usage. Various other types of bidding arrangement can be utilized as well, such as where a user purchases a committed overall amount of capacity, but applies that capacity commitment across multiple resources. Bidding for additional capacity can also be dynamic, such as where the user is willing to purchase dedicated capacity when the market price drops below a specified level.

In some embodiments, a user going over the guaranteed or dedicated capacity might be able to obtain additional capacity, but might have to pay the current market price for uncommitted request processing. A user with 100 guaranteed IOPS then would have to pay market price for the $101^{st}$ I/O operation. Users then can exceed their guarantees when necessary, without having to provide a relatively large set of bid amounts to cover various situations. As long as the capacity is available, the user can be allowed to utilize the excess capacity. In some cases, users might be capped to a certain level of usage. If a user does not want to pay for a lot of, or any, excess usage, the user might put a limit on the amount of resource capacity that can be provided to the user. For example, the user might indicate that requests should only be processed up to the guaranteed amount, such as up to only 100 IOPS. In other embodiments, a user might set a threshold amount or prices, such as where the user will set a maximum cap of 110 IOPS or a maximum excess charge of $0.50/hr, which enables requests to be processed up to an amount that is based at least in part upon the current market price. In some embodiments, a user can request to be notified if excess usage is detected, in order to evaluate aspects such as whether additional capacity should be purchased or whether the user application is not running as expected.

Users can also, in at least some embodiments, adjust their bid prices as often as necessary, as may be based upon the importance of certain requests, current applications being executed, etc. In such a spot market, a user can increase a bid amount to ensure that the user gets priority to extra capacity (e.g., extra IOPS or bandwidth) when that capacity becomes available. The user can also monitor the current market price, and can adjust bids dynamically to ensure that the bids submitted at least meet market price. A user also can have the option to specify, for each request where the user does not have guaranteed capacity or is over that capacity, whether to purchase generally available resources that are not guaranteed (e.g., on-demand variable capacity), or excess capacity from dedicated users that can be guaranteed for at least a period of time.

In another example of resource capacity usage, a user might be doing sequential file access and thus might also be interested in the bandwidth for the number of input/output (I/O) operations. Thus, the user might be willing to only bid for a minimum level of megabytes per second (mbps), gigabytes per second, or other such rate. As opposed to random I/O, where the main limiter to the amount of data movement is often the physical head movement speed of the disk, the limiting factor is how quickly data can be streamed from the physical data source, or in particular for at least some embodiments how much data can be pushed through the network interface that connects the virtual computing instances with the virtual disk drives. Certain applications require a level of I/O bandwidth coming from their virtual disks in order to achieve the business goals around computational latency. On example of such applications relates to financial markets, where there are only a few "dark" hours for data processing before the market reopens, and all data simulations must be performed during those few dark hours. The conventional approach to purchasing additional hardware is not optimal, as the hardware would be largely sitting idle when the simulations are not being run. Using a system or service such as a program execution service (PES) enables a user to purchase or reserve excess capacity as needed. In some cases the user can bid for guaranteed capacity during only certain hours, which can be treated either as dedicated or reserved capacity in different embodiments, while in other embodiments the user can just purchase a daily guarantee and the PES Manager can perform the scheduling in order to provide lower cost processing to the user. The PES Manager can also manage other users to further reduce costs, such as to allocate other types of users for a resource, such as uses who are doing cold storage and do not require committed bandwidth. A specified amount of bandwidth can also be provided, for a period of time, inside a cluster on a shared resource.

Figures 8A, 8B:
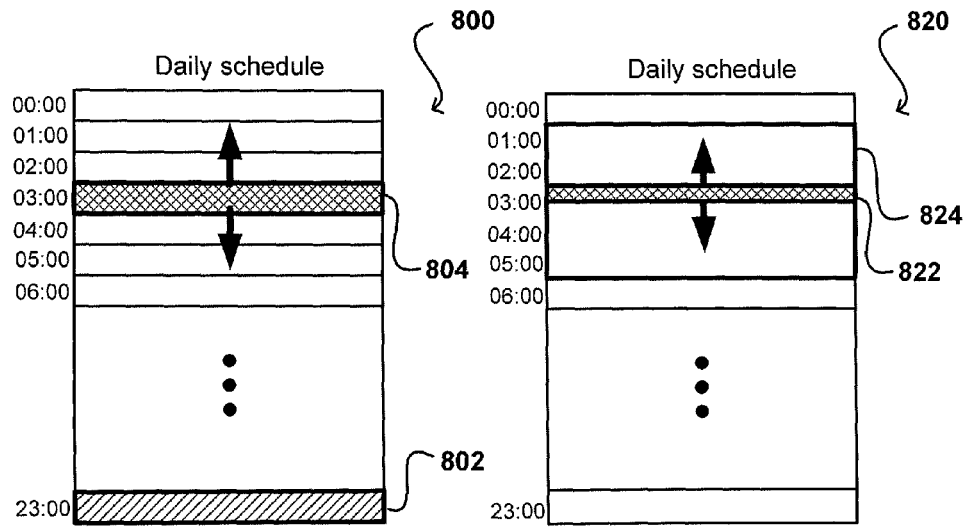
FIGS. 8(a) and 8(b) illustrate time windowing approaches for bandwidth guarantees that can be used in accordance with various embodiments.

FIGS. 8(a) and 8(b) illustrate example time windows that can be used for scheduling periods with specified bandwidth rates in accordance with various embodiments. In FIG. 8(a), a user requests a volume with a 200 GB capacity in a specific geographical region, with 100 mbps of bandwidth between 11 p.m. and 12 a.m. every day. This corresponds to a fixed window 802, where the level of bandwidth is provided during specified times in which that capacity is dedicated to that user. In another example, the user could request 100 mbps of bandwidth for a period of sixty minutes each day, and may not care when that sixty minute period is scheduled. This can correspond to a sliding window 804, which has a specified duration (here sixty minutes) but that sixty minutes can be provided at any time throughput the day, as may be determined by a PES Manager or other module or component. Thus, for a resource capacity such as bandwidth, there can be at least one additional parameter that specifies one or more aspects of a time windowing approach to be used for the processing. For example, a user might have the 200 GB capacity 24 hours a day, but might only obtain a level of at least 100 mbps during the specified window of time for which the user is willing to pay for the guarantee. Outside that time window, the user can get a different rate, such as might be available for the resource at that point in time. In some embodiments, a system might provide a minimum guarantee for sequential access, such as at least 10 mbps, while in other embodiments a user without a guarantee might have no ability to rely upon a minimum bandwidth (although the system in general will typically want to avoid bottlenecks and lack of bandwidth in order to avoid losing customers). In some embodiments, a customer might have a first guarantee to be used as a default, such as at least 50 mbps throughput the day, and a second guarantee within a specified time window, such as at least 200 mbps for a fifteen minute period each day.

Bandwidth capacity thus can be treated differently from capacity such as compute or IOPS capacity, for example, as a customer may utilize a relatively consistent rate of IOPS over time. For applications such as high performance data computing (HPC) or data warehousing, however, the customer will typically read a large amount of data at the beginning of a process, streaming data from disk for a period of twenty to thirty minutes, for example, and then will not stream data for a period of time, such as a number of hours, while that data is being processed. Then, near the end of the process, the customer will stream the data back to disk for a period of time, such as ten to twenty minutes. It thus may not be cost effective for customers to purchase committed bandwidth on a monthly (or other such) basis, as the user might with IOPS, as the customer may only be using that level of bandwidth for a small portion of the time in specific windows of time. Enabling the customer to obtain capacity rates for specific time windows enables the cost to be lowered as the customer does not pay for the capacity over an entire month, and also enables costs to be reduced as multiple users with different types of workloads can utilize the same resources, and thus can share the costs. A customer thus can get a fixed window of time each day, or a sliding time window that can be processed at any time of day, while other users are being served using that resource. In one example, such as is illustrated using the schedule 820 of FIG. 8(b), a user might request a period of twenty minutes of 100 mbps capacity within a five hour window 824, where a sliding inner window 822 represents the twenty minute period that can be provided anywhere within the five hour window 824. A customer might request such an approach when the customer wants twenty minutes of high bandwidth capacity, and doesn't care when those twenty minutes are provided as long as they are provided during the five hours when the customer business is closed, for example. In such an example, the customer might pay for 50 mbps averaged per hour for all other times outside that twenty minute sliding window. The PES Manager might then also provide and manage slices of time, or time slots, along with pools of available bandwidth resources. Pricing also can be reduced using any of a number of other appropriate factors, such as the length of the commitment, number of commitments, guaranteed minimums, etc.

In addition to bandwidth, rate of I/O operations, and other such capacities, a customer might also be willing to pay for a maximum or average latency target for requests as discussed above. In some systems the latency might not be separately managed, as guaranteed levels of IOPS and bandwidth can at least partially control the latency that a customer receives. A guaranteed rate of 1,000 IOPS, however, can potentially be met by delivering 10,000 IOPS over a period of 10 seconds. It may often be the case that a 10 second latency value will be unacceptable to various customers. If a customer wants an average latency of 15 milliseconds, or even a maximum latency of 15 milliseconds for high throughput applications, the system must provide some controls, limits, guidelines, guarantees, or other such aspects in order to provide acceptable levels of latency even when guaranteed levels of throughput are being met. In at least one embodiment, guaranteed levels of latency can be provided by managing requests such that there are not more than two outstanding operations on any spindle or other physical storage device at any time. Such an approach can potentially reduce throughput, particularly for sequential operations, such that a balance might be struck between latency and throughput. An example of such a balancing approach is described in co-pending U.S. patent application Ser. No. 12/749,451, filed Mar. 29, 2010, entitled "Dynamically Changing Quality of Service Levels," which is hereby incorporated herein by reference. In other embodiments, the PES Manager can monitor loads on various resources and can determine how many operations can be sent to a device at the current time while still meeting guarantees. Thus, many customers might be willing to submit different bids for different combinations of IOPS and latency, as discussed above, where a customer with a guaranteed rate of IOPS is willing to pay extra for a particular latency guarantee, or is not willing to submit a bid when a minimum latency cannot be provided, even if the resource is able to provide the guaranteed rate of IOPS.

Figure 9:
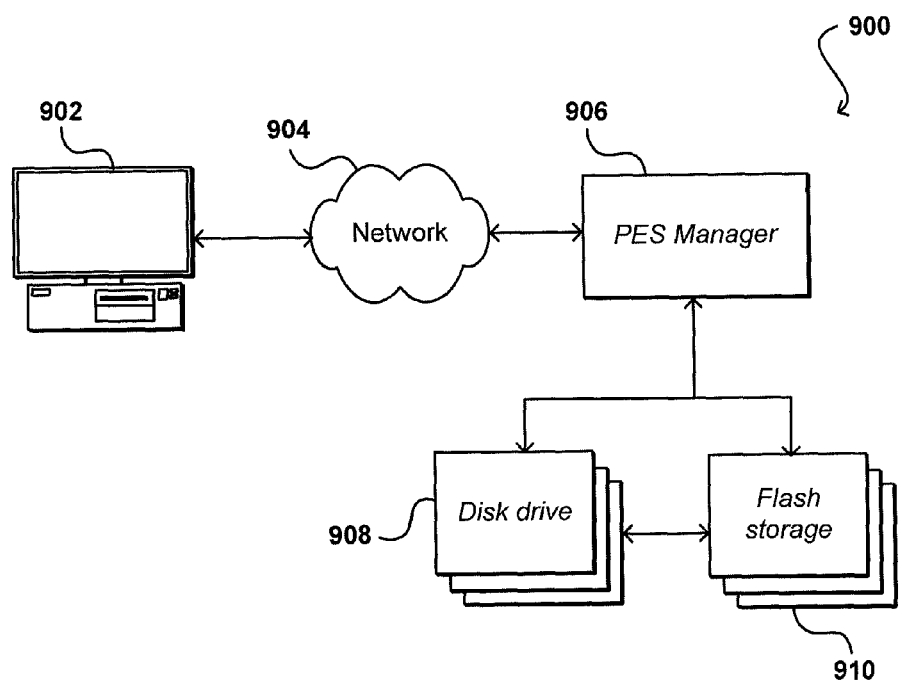
FIG. 9 illustrates components useful for shifting data between devices providing differing levels of latency that can be used in accordance with various embodiments.

An approach in accordance with one embodiment is to use flash memory or another such solid state storage solution for at least part of the guaranteed capacity, which can be provided as part of dedicated, reserved, or excess capacity. A general environment 900 for providing such components is illustrated in FIG. 9. It should be understood that many additional components can be used to provide functionality as discussed and suggested herein, and as would be apparent to one of ordinary skill in the art in light of the teachings and suggestions contained herein. In this example, a customer 902 subscribes (over a network 904) to a program execution service including a PES Manager 906 for managing the processing of requests, execution of programs, and other such aspects on behalf of the customer 902. The customer might request a dedicated 1 TB volume to be provided and managed by the service. The volume could be created using conventional disk-based storage 908, storing data across one or more drives or spindles, but latency for such storage can be limited by the physical constraints of the storage mechanism (e.g., seek times, etc.) A customer might want a guaranteed average or maximum latency that is greater than can be provided with the disk-based storage. The PES Manager could instead create the volume using solid state storage, such as one or more "flash" storage devices, which can provide a much lower average latency as there are no delays due to head movements or other such mechanical constraints. Such an approach, however, can be prohibitively expensive for certain customers in a conventional environment, as the cost of storing a volume of data to a solid state drive (SSD) is currently significantly more expensive than storing the same volume of data to conventional disk-based storage.

An approach in accordance with various embodiments enables a balancing of speed and cost by enabling a portion of the volume for the customer to be stored using one or more solid state drives 908, while storing the remainder of the volume to disk-based storage 910. Further, the latency that the customer receives can be monitored, and the amount of data stored to the SSD can change over time, as the PES Manager can cause varying amounts of data to be shifted between the SSD and disk storage at different times in order to remain within an allowable range of the latency target. For example, a customer might have an average latency guarantee of 15 ms, with a maximum latency guarantee of 20 ms. At a point in time under a current load, the conventional storage might only be able to provide a latency of 18 ms. By way of contrast, a flash device might be able to provide a latency of 3 ms. A PES Manager or other such component or algorithm thus can compute how much of the volume should be moved to flash in order to reduce the average latency to meet the latency guarantee, while moving the minimum amount of data to flash to minimize cost.

Figure 10:
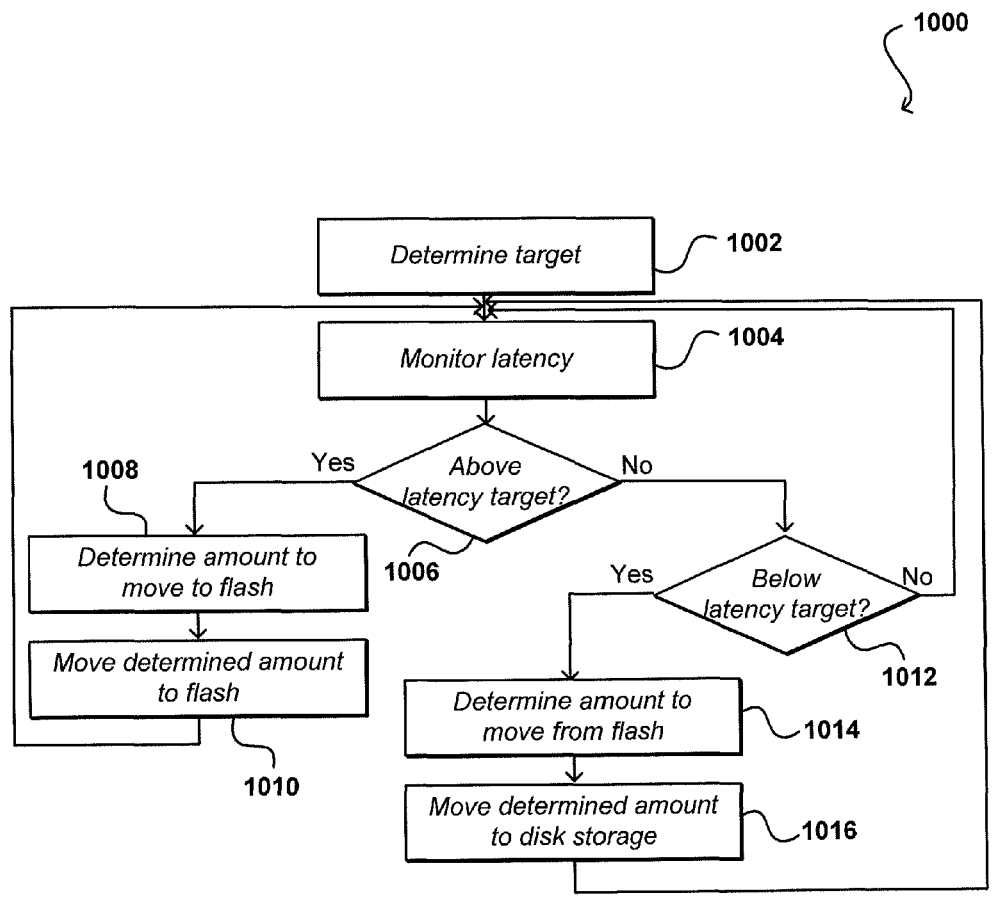
FIG. 10 illustrates an example process for maintaining user latency near a target latency value that can be used in accordance with various embodiments.

FIG. 10 illustrates an example process 1000 that can be used to provide the guaranteed latency in accordance with at least one embodiment. In this example, a PES Manager (or other such module or component) determines the committed or guaranteed latency target 1002 to be provided to the user as part of a dedicated or excess resource capacity agreement. As requests for the user are processed, the PES Manager can monitor the actual latency (e.g., average, maximum, etc.) that the user receives 1004, and can determine whether the actual latency received is above the latency target 1006. If the actual value is above the target, such that the average latency is greater than the committed value, the PES Manager can determine an amount of data to be moved to flash storage or another SSD 1008, and can cause that amount of data to be moved to flash storage 1010 in order to reduce the latency to near the latency target. If, instead, the latency target is determined to be below the latency target 1012, the PES Manager can instead determine an amount of data to be moved to flash storage or another SSD 1014, and can cause that amount of data to be moved from disk storage 1016 in order to reduce the cost of the processing while still remaining within the guaranteed amount of latency for that customer.

In some embodiments, the customer might be charged for the amount of flash used, while in other embodiments the customer will simply pay a flat fee for the latency guarantee, and the system will manage the processing such that only the minimum amount of flash is used at any time, and can compute an appropriate flat fee based on average usage or some other such information.

Further, depending on load, type of operation, and other such information the amount of data in flash can vary over time. A PES Manager can monitor the usage, and can move data into, and out of, flash as appropriate to meet the guarantees but utilize the more expensive flash storage as little as possible. In some embodiments, a customer could pay for the usage in other ways, such as by paying for a certain percentage of operations (e.g., 10% or 50%) of the operations to be returned in under 5 ms, etc., and that percentage could be stored to flash. And that percentage can be monitored over time as well, with data being moved as needed to stay as close to that percentage as possible. In certain embodiments there is substantially only one operation on a physical device at any time, but a customer might want a level of latency that is less than can be provided with conventional storage, such that solid state storage may be preferable for at least a portion of the operations.

In some embodiments, a level of latency provided will be determined for each customer over a given period to be used for billing the customer, as opposed to charging a flat fee, etc. In some embodiments, the customer will provide the desired latency profile ahead of time, and the system will have to use monitoring information and prediction algorithms in order to attempt to meet that latency profile. Any appropriate prediction algorithm can be used, such as a random, read-ahead, or least recently used (LRU) algorithm, although a greedy-dual algorithm or other weighted prediction algorithm can be used as well within the scope of the various embodiments.

Figure 11:
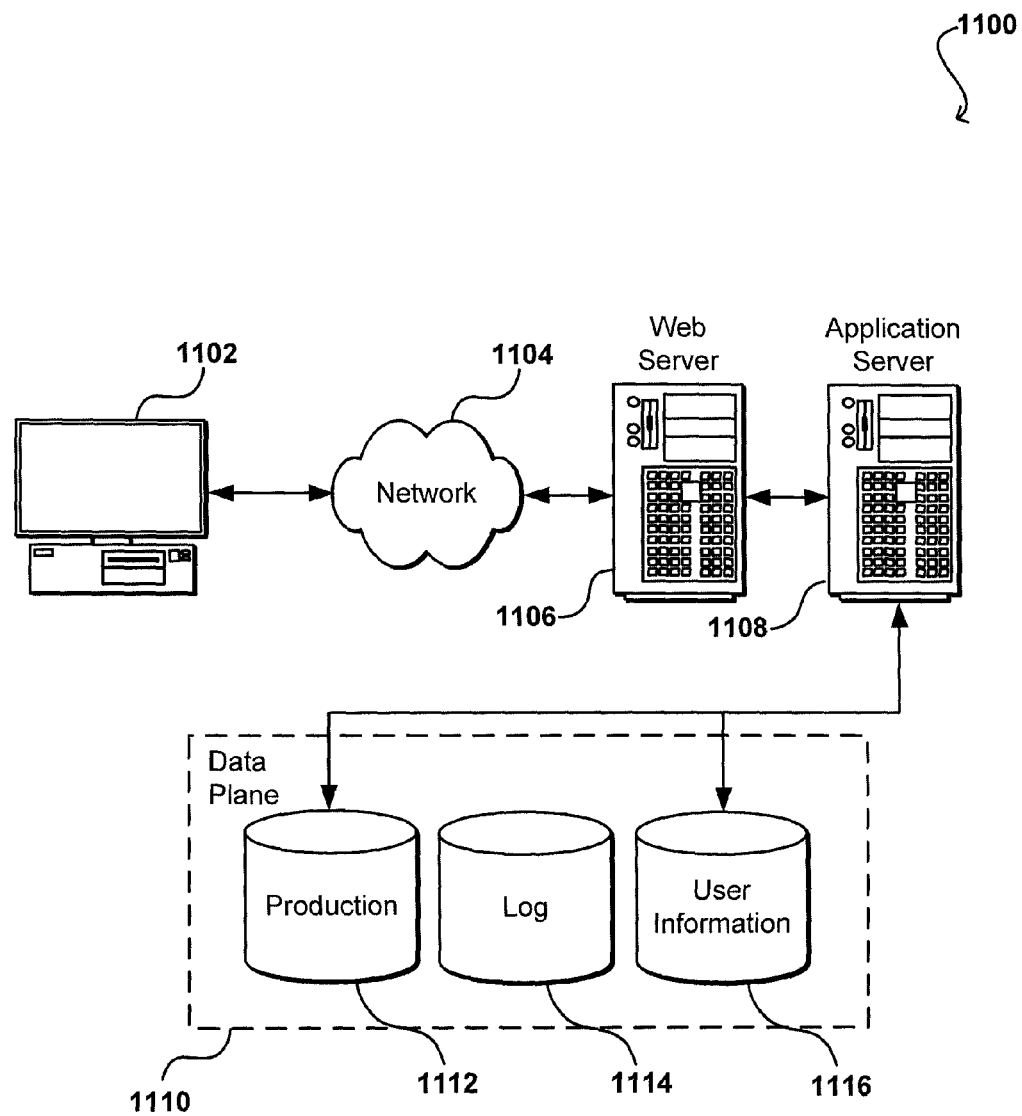
FIG. 11 illustrates an example environment that can take advantage of functionality of the various embodiments.

FIG. 11 illustrates an example of an environment 1100 that can utilize and/or take advantage of aspects in accordance with various embodiments. As will be appreciated, although a Web-based environment is used for purposes of explanation, different environments may be used, as appropriate, to implement various embodiments. The environment 1100 shown an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analytics, or other appropriate reasons. It should be understood that there can be many other aspects that may need to be stored in the data store, such as for page image information and access right information, which can be stored in any of the above listed mechanisms as appropriate or in additional mechanisms in the data store 1110. The data store 1110 is operable, through logic associated therewith, to receive instructions from the application server 1108 or development server 1120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

An environment such as that illustrated in FIG. 11 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing shared resources, comprising:
under control of one or more computer systems configured with executable instructions,
receiving an instance request associated with a user, the instance request specifying a bid price and a minimum rate of I/O operations to be used in invoking resource capacity for a user;
determining whether available resource capacity exists to fulfill the instance request with the minimum rate of I/O operations and whether the bid price at least meets a current market price for the available capacity;
if the available capacity exists and the bid price at least meets the current price, comparing the bid price to any competing bid price for the available resource capacity; and if the instance request meets at least one selection criterion, based at least in part upon the bid price, causing the instance request to be fulfilled using the available capacity.

2. The computer-implemented method of claim 1, wherein the instance request is fulfilled using dedicated or reserved capacity if a user associated with the instance request has available dedicated or reserved capacity.

3. The computer-implemented method of claim 1, wherein the available capacity is excess capacity of at least one resource type, the excess capacity capable of being unused dedicated or reserved capacity.

4. The computer-implemented method of claim 1, wherein the instance request further specifies at least one other category of resource capacity to be used in fulfilling the instance request.

5. The computer-implemented method of claim 4, wherein the instance request includes at least one additional bid price based at least in part upon meeting a level of resource capacity for the at least one other category of resource capacity.

6. The computer-implemented method of claim 4, wherein the at least one other category of resource capacity includes at least one of compute capacity, storage capacity, bandwidth, or latency.

7. The computer-implemented method of claim 1, wherein the instance request does meet at least one selection criterion, and further comprising:
 attempting to fulfill the instance request using available variable on-demand capacity; and
 if the instance request is unable to be fulfilled using available variable on-demand capacity, denying the instance request.

8. The computer-implemented method of claim 1, further comprising:
 if the instance request is being fulfilled using the available capacity, determining after at least one period of time whether the instance request still meets at least one selection criterion, based at least in part upon the current market price; and
 if the instance request no longer meets at least one selection criterion, terminating fulfillment of the instance request using the available capacity.

9. The computer-implemented method of claim 1, further comprising:
 if the instance request is being fulfilled using the available capacity, determining after at least one period of time whether another user associated with the available capacity has a separate instance request to be fulfilled using the available capacity; and
 if the other user associated with the available capacity has a separate instance request to be fulfilled using the available capacity, terminating fulfillment of the instance request using the available capacity.

10. The computer-implemented method of claim 9, wherein fulfillment of the instance request using the available capacity is terminated, and further comprising:
 attempting to fulfill the instance request using available variable on-demand capacity, the available variable on-demand capacity capable of having no guaranteed rate of I/O operations.

11. The computer-implemented method of claim 9, wherein terminating the fulfillment of the instance request includes at least one of destroying a volume associated with the instance request, deactivating an instance associated with the request, taking at least one snapshot of a volume associated with the instance request and storing the snapshot for subsequent retrieval, or changing the fulfillment of the instance request to an uncommitted level of fulfillment.

12. The computer-implemented method of claim 1, wherein the instance request is associated with at least one program, fulfilling of the instance request comprising executing the at least one program using the available capacity.

13. The computer-implemented method of claim 1, wherein a bid price for the request is not considered if at least one specified level for at least one resource type for fulfilling the instance request is not available using the available capacity.

14. The computer-implemented method of claim 1, further comprising:
 periodically adjusting the market price based at least in part upon a target capacity usage, the adjusted market price causing more or fewer requests to meet at least one selection criterion.

15. The computer-implemented method of claim 1, further comprising:
 for fulfilling instance requests in excess of a capacity limit for the available capacity, attempting to fulfill the excess instance requests using an uncommitted type of capacity.

16. The computer-implemented method of claim 1, further comprising:
 periodically receiving adjusted bid prices for the instance request during fulfilling, the adjusted bid prices being submitted to ensure that the instance request is fulfilled using the available capacity even in the presence of an adjusting market price and new competing bids.

17. The computer-implemented method of claim 1, wherein the instance request is received from a customer as a Web services request through an application programming interface (API) of a control plane.

18. A system for managing shared resources, comprising:
 at least one processor; and
 memory including instructions that, when executed by the at least one processor, cause the system to:
  receive an instance request associated with a user, the instance request specifying a bid price and a minimum rate of I/O operations to be used in invoking resource capacity for a user;
  determine whether available resource capacity exists to fulfill the instance request with the minimum rate of I/O operations and whether the bid price at least meets a current market price for the available capacity;
  if the available capacity exists and the bid price at least meets the current price, compare the bid price to any competing bid price for the available resource capacity; and
  if the request meets at least one selection criterion, based at least in part upon the bid price, cause the instance request to be fulfilled using the available capacity.

19. The system of claim 18, wherein the instance request is fulfilled using dedicated or reserved capacity if a user associated with the instance request has available dedicated or reserved capacity.

20. The system of claim 18, wherein the instance request further specifies at least one other type of resource capacity to be used in fulfilling the instance request.

21. The system of claim 18, wherein the instance request does not meet at least one selection criterion, and wherein the instructions when executed further cause the system to:
 attempt to fulfill the instance request using available variable on-demand capacity; and if the instance request is unable to be fulfilled using available variable on-demand capacity, deny the instance request.

22. The system of claim 18, wherein the instructions when executed further cause the system to:
if the instance request is being fulfilled using the available capacity, determine after at least one period of time whether the instance request still meets at least one selection criterion, based at least in part upon the current market price; and
if the instance request no longer meets at least one selection criterion, terminate fulfillment of the instance request using the available capacity.

23. A computer-readable storage medium including instructions for managing shared resources, the instructions when executed by a processor causing the processor to:
receive an instance request associated with a user, the instance request specifying a bid price and a minimum rate of I/O operations to be used in invoking resource capacity for a user;
determine whether available resource capacity exists to fulfill the instance request with the minimum rate of I/O operations and whether the bid price at least meets a current market price for the available capacity;
if the available capacity exists and the bid price at least meets the current price, compare the bid price to any competing bid price for the available resource capacity; and
if the request meets at least one selection criterion, based at least in part upon the bid price, cause the instance request to be fulfilled using the available capacity.

24. The computer-readable storage medium of claim 23, wherein the instance request is fulfilled using dedicated or reserved capacity if a user associated with the instance request has available dedicated or reserved capacity.

25. The computer-readable storage medium of claim 23, wherein the instance request further specifies at least one other type of resource capacity to be used in fulfilling the instance request.

26. The computer-readable storage medium of claim 23, wherein the instance request does not meet at least one selection criterion, and wherein the instructions when executed further cause the system to:
attempt to fulfill the instance request using available variable on-demand capacity; and
if the instance request is unable to be fulfilled using available variable on-demand capacity, deny the instance request.

27. The computer-readable storage medium of claim 23, wherein the instructions when executed further cause the system to:
if the instance request is being fulfilled using the available capacity, determine after at least one period of time whether the instance request still meets at least one selection criterion, based at least in part upon the current market price; and
if the instance request no longer meets at least one selection criterion, terminate fulfillment of the instance request using the available capacity.

28. The computer-implemented method of claim 1, wherein the instance request further specifies a type of resource capacity, and further comprising:
if the type of capacity is a dedicated capacity type and dedicated capacity for the user with at least the rate of I/O operations is available, generating an instance for the user using the dedicated capacity;
if the type of capacity is a reserved capacity type and reserved capacity for the user with at least the rate of I/O operations is available, generating an instance for the user using the reserved capacity;
if the type of capacity is an excess capacity type:
determining whether a bid price is a winning bid price, the winning bid price being greater than other pending bids for the same excess capacity and being at least equal to the current market price; and
if the bid price is the winning bid price and excess capacity for the user with at least the rate of I/O operations is available, generating an instance for the user using the excess capacity for at least a minimum period of time; and
if the type of capacity is a variable capacity type and variable capacity is available, generating an instance for the user using the variable capacity, the variable capacity capable of having less than the rate of I/O operations specified for the instance request.

29. The computer-implemented method of claim 28, further comprising:
if the dedicated capacity with the rate of I/O operations is not available for the instance request specifying the dedicated capacity type, changing the type of capacity specified by the instance request to one of an excess capacity type or a variable capacity type;
if the reserved capacity with the rate of I/O operations is not available for the instance request specifying the reserved capacity type, changing the type of capacity specified by the instance request to one of an excess capacity type or a variable capacity type;
if the excess capacity with the rate of I/O operations is not available for the instance request specifying the excess capacity type, changing the type of capacity specified by the instance request to a variable capacity type; and
if the variable capacity is not available for the instance request specifying the variable capacity type, denying the instance request.

30. The computer-implemented method of claim 28, further comprising:
if the instance request is being fulfilled using the excess capacity and the excess capacity becomes no longer available, moving an instance corresponding to the request to variable capacity if available.

31. The computer-implemented method of claim 1, further comprising:
receiving a reservation request from the user to utilize the resource capacity prior to receiving the instance request associated with the user;
enabling the user to purchase dedicated capacity for fulfilling at least a portion of the instance request if dedicated capacity is available with the specified rate of I/O operations, the dedicated capacity being available at any time for use by the user;
enabling the user to purchase reserved capacity for fulfilling at least a portion of the instance request if reserved capacity is available with the specified rate of I/O operations, the user being given priority to use the reserved capacity over other users; and
if a user is unable to purchase dedicated or reserved capacity, in response to a subsequent instance request:
enabling the user to bid on excess capacity for fulfilling at least a portion of the instance request if excess capacity is available with the specified rate of I/O operations at substantially a time of submission of the instance request, the excess capacity being available when the bid price for the user at least meets a market price for the excess capacity, the user being able to utilize the excess capacity for at least a period of time when the bid price meets at least one selection criterion; and enabling the user to utilize available variable on-demand capacity for fulfilling at least a portion of the instance request if available variable on-demand capacity is available.

32. The computer-implemented method of claim 31, further comprising enabling the user to specify another type of capacity to use to fulfill any instance requests that exceed an amount of capacity specified by the user for at least a portion of the fulfillment.

33. The computer-implemented method of claim 31, further comprising enabling the user to dynamically adjust the bid price for the excess capacity in order to continue fulfillment for the instance request using the excess capacity.

34. The computer-implemented method of claim 31, further comprising enabling the user to submit a plurality of bids for excess capacity, each bid having a bid price based on a combination of levels of capacity for multiple categories of resource capacity.

* * * * *